US009357417B2

(12) United States Patent
Siomina et al.

(10) Patent No.: US 9,357,417 B2
(45) Date of Patent: May 31, 2016

(54) METHODS, SYSTEMS AND DEVICES FOR OBTAINING SYSTEM INFORMATION IN A WIRELESS NETWORK

(71) Applicant: Telefonaktiebolaget L M Ericsson (publ), Stockholm (SE)

(72) Inventors: Iana Siomina, Solna (SE); Muhammad Kazmi, Bromma (SE); Thomas Chapman, Stockholm (SE)

(73) Assignee: Telefonaktiebolaget L M Ericsson, Stockholm (SE)

(*) Notice: Subject to any disclaimer, the term of this patent is extended or adjusted under 35 U.S.C. 154(b) by 107 days.

(21) Appl. No.: 13/804,652

(22) Filed: Mar. 14, 2013

(65) Prior Publication Data

US 2014/0051426 A1    Feb. 20, 2014

Related U.S. Application Data

(60) Provisional application No. 61/684,457, filed on Aug. 17, 2012.

(51) Int. Cl.
H04W 4/00 (2009.01)
H04W 24/10 (2009.01)
H04W 48/16 (2009.01)
H04W 36/00 (2009.01)

(52) U.S. Cl.
CPC .......... *H04W 24/10* (2013.01); *H04W 36/0088* (2013.01); *H04W 48/16* (2013.01)

(58) Field of Classification Search
USPC ............... 455/422.1, 449, 436, 444; 370/312, 370/328, 254
See application file for complete search history.

(56) References Cited

U.S. PATENT DOCUMENTS

| 6,161,140 | A  | * | 12/2000 | Moriya | 709/228 |
| 8,412,211 | B2 | * | 4/2013 | Petrovic | H04W 48/10 370/312 |
| 8,577,371 | B2 | * | 11/2013 | Arora et al. | 455/436 |
| 9,125,072 | B2 | * | 9/2015 | Ji | H04L 1/0027 455/452.1 |
| 9,144,100 | B2 | * | 9/2015 | Narasimha | H04W 76/028 |
| 2002/0071404 | A1 | * | 6/2002 | Park et al. | 370/331 |
| 2004/0174845 | A1 | * | 9/2004 | Koo et al. | 370/328 |
| 2005/0048982 | A1 | * | 3/2005 | Roland et al. | 455/449 |

FOREIGN PATENT DOCUMENTS

WO  WO 2011/035420 A1  3/2011
WO  WO 2011/088468 A1  7/2011

OTHER PUBLICATIONS

International Search Report, PCT Application No. PCT/IB2013/056646, Date of Mailing: Feb. 10, 2014, 7 pages.

(Continued)

*Primary Examiner* — Mong-Thuy Tran
(74) *Attorney, Agent, or Firm* — Myers Bigel & Sibley, P.A.

(57) ABSTRACT

System Information (SI) of a second node of a wireless network is obtained for a wireless device that is communicating with a first node of the wireless network. In response to at least one criterion, one or more of the following operations are performed, to obtain the SI of the second node: decoding at least one channel of the second node to obtain the SI of the second node; receiving the SI of the second node from a node other than the second node; and/or inferring at least one component of the SI of the second node based on a corresponding at least one component of the SI of the first node. Related systems, methods, nodes and wireless devices are also described.

43 Claims, 17 Drawing Sheets

(56) References Cited

U.S. PATENT DOCUMENTS

| | | | |
|---|---|---|---|
| 2009/0154388 A1* | 6/2009 | Jalloul et al. | 370/312 |
| 2009/0270103 A1* | 10/2009 | Pani et al. | 455/436 |
| 2009/0274086 A1* | 11/2009 | Petrovic et al. | 370/312 |
| 2010/0311422 A1* | 12/2010 | Jun et al. | 455/436 |
| 2010/0331030 A1* | 12/2010 | Nory et al. | 455/509 |
| 2011/0179330 A1* | 7/2011 | Matsumoto | 714/748 |
| 2011/0300866 A1* | 12/2011 | Ali et al. | 455/436 |
| 2013/0010619 A1* | 1/2013 | Fong et al. | 370/252 |
| 2013/0084910 A1* | 4/2013 | Suzuki et al. | 455/515 |
| 2013/0223235 A1* | 8/2013 | Hu et al. | 370/242 |

OTHER PUBLICATIONS

Written Opinion of the International Searching Authority, PCT Application No. PCT/IB2013/056646, Date of Mailing: Feb. 10, 2014, 9 pages.

3GPP: "3GPP TS 36.331 V9.4.0 (Sep. 2010) Technical Specification $3^{rd}$ Generation Partnership Project; Technical Specification Group Radio Access Network; Evolved Universal Terrestrial Radio Access (E-UTRA); Radio Resource Control (RRC); Protocol specification (Release 9)", Internet Citation, Sep. 1, 2010, XP008163200; 252 pages.

\* cited by examiner

METHODS, SYSTEMS AND DEVICES FOR OBTAINING SYSTEM INFORMATION IN A WIRELESS NETWORK

CROSS-REFERENCE TO RELATED APPLICATION

This non-provisional patent application claims priority to U.S. Provisional Application No. 61/684,457, filed Aug. 17, 2012, entitled Methods for Obtaining System Information, the disclosure of which is hereby incorporated herein by reference as if set forth fully herein.

TECHNICAL FIELD

Various embodiments described herein relate to radio frequency communications and, more particularly, to wireless communication networks and devices, and methods of operating the same.

BACKGROUND

Wireless communication networks are increasingly being used for wireless communications with various types of wireless terminals. The wireless network itself may include a plurality of wireless base stations, also commonly referred to as "base stations", "radio access nodes", "RAN nodes", "NodeBs", "eNodeBs" or simply as "nodes", that define a plurality of cells, and a core network that controls the base stations and interfaces the base stations with other wired and/or wireless networks. The nodes may be terrestrial and/or space-based. The nodes communicate with wireless terminals, also referred to as "User Equipment (UE)", "mobile stations", "user terminals", "terminals" or simply as "wireless devices", using radio resources that are allocated to the wireless network. The radio resources may be defined in terms of time (for example, in a Time Division Multiple Access (TDMA) system), frequency (for example, in a Frequency Division Multiple Access (FDMA) system) and/or code (for example, in a Code Division Multiple Access (CDMA) system) or time-frequency resource (for example a resource block, in a Orthogonal Frequency Division Multiple Access (OFDMA) system). The nodes may use licensed and/or unlicensed frequency spectrum. Radio resources may be assigned to wireless devices by the wireless network upon initial communication and may be reassigned due to, for example, movement of the wireless devices, changing bandwidth requirements, changing network traffic, etc.

In order to communicate with a node, a wireless device generally synchronizes to a node, acquires the physical-layer identity of the node, and detects the frame timing of the node, using a search procedure. Once this has been achieved, the wireless device generally has to acquire the node's System Information (SI). SI includes information that is repeatedly broadcast by a wireless network, and which generally needs to be acquired by wireless devices in order for them to be able to access, and to operate properly within the wireless network and within a specific node. The SI includes, among other things, information about the downlink and uplink cell bandwidths, detailed parameters related to random access transmission and uplink power control, etc.

The approaches described in this section could be pursued, but are not necessarily approaches that have been previously conceived or pursued. Therefore, unless otherwise indicated herein, the approaches described in this section are not prior art to claims in this application and any application claiming priority from this application, and are not admitted to be prior art by inclusion of this section.

SUMMARY OF THE INVENTION

Various embodiments described herein can provide methods of obtaining System Information (SI) of a second node of a wireless network for a wireless device that is communicating with a first node of the wireless network. According to various embodiments described herein, at least one of the following operations is selectively performed in response to at least one criterion: decoding at least one channel of the second node to obtain the SI of the second node, receiving the SI of the second node from a node other than the second node, and/or inferring at least one component of the SI of the second node based on a corresponding at least one component of the SI of the first node. The node other than the second node may include the first node and/or a third node that is different from the first and second nodes. In other embodiments, at least two of the operations are selectively performed in response to the at least one criterion. Accordingly, SI may be obtained even under potentially difficult situations.

In some embodiments, the at least one criterion comprises a predefined rule for selectively performing the at least two of the operations, a wireless communications signal measurement-based criterion for selectively performing the at least two of the operations, and/or a recommendation from a wireless network element other than the wireless device for selectively performing the at least two of the operations.

In some embodiments, the predetermined rule comprises performing the receiving if the decoding fails and performing the inferring if the receiving is not performed within a given time. In other embodiments, the wireless communications signal measurement-based criterion comprises an absolute and/or relative quality measure of a signal from the second node, and the selectively performing comprises performing the decoding if the absolute and/or relative quality measure of a signal from the second node exceeds a threshold and performing the receiving or the inferring if the absolute and/or relative quality measure of the signal from the second node is less than the threshold.

In other embodiments, the wireless communications signal measurement-based criterion comprises an absolute and/or relative quality measure of a signal from a node other than the first and second nodes, and the selectively performing comprises performing the decoding if an absolute and/or relative quality measure of a signal from a node other than the first and second nodes is less than a threshold and performing the receiving or the inferring if the absolute and/or relative quality measure of the signal from the node other than the first and second nodes exceeds the threshold. In still other embodiments, the wireless communications signal measurement-based criterion comprises a difference between an absolute and/or relative quality measure of a signal from the second node and from a node other than the first and second nodes, and the selectively performing comprises performing the decoding if the difference between the absolute and/or relative quality measure of a signal from the second node and from the node other than the first and second nodes is less than a threshold and performing the receiving or the inferring if the difference between the absolute and/or relative quality measure of the signal from second node and from the node other than the first and second nodes exceeds the threshold.

In yet other embodiments, the criterion comprises a battery level of the wireless device, and the selectively performing comprises performing the decoding if the battery level of the wireless device exceeds a threshold and performing the receiving or the inferring if the battery level of the wireless device is less than the threshold. In still other embodiments, the criterion comprises power consumption of the wireless device, and the selectively performing comprises performing a selected one of the decoding, receiving and inferring that consumes least power at the wireless device. In still other embodiments, the criterion comprises a class of wireless devices to which the wireless device belongs, and the selectively performing comprises performing a selected one of the decoding, receiving and inferring based upon the class of wireless devices to which the wireless device belongs. In still other embodiments, the criterion comprises an absolute or relative location of the wireless device, and the selectively performing comprises performing a selected one of the decoding, receiving and inferring based upon the absolute or relative location of the wireless device.

In yet other embodiments, the criterion comprises carrier frequency differences between the first and second nodes, bandwidth, number of strong interferers, carrier aggregation configuration of the wireless device and/or capability of the wireless device to obtain the SI. In yet other embodiments, the criterion comprises System Frame Number (SFN) synchronization differences between the first and second nodes, and the selectively performing comprises performing the decoding if the SFN of the first and second nodes is the same and performing the receiving or the inferring if the SFN of the first and second nodes is different.

In still other embodiments, the criterion comprises an accuracy of time synchronization of signals transmitted by the first and second nodes, received time difference of signals at the wireless device from the first and second nodes and/or an accuracy of frequency synchronization of signals transmitted by the first and second nodes. In these embodiments, the selectively performing may comprise performing the decoding if the accuracy of the transmit time synchronization and/or the received time difference at the wireless device is greater than their respective threshold and the accuracy of frequency synchronization is greater than a threshold and performing the receiving or the inferring if the accuracy of the transmit time synchronization, the received time difference at the wireless device and/or the accuracy of frequency synchronization are less than their respective thresholds.

According to any of the embodiments described herein, the inferring may comprise setting at least one component of the SI of the second node other than an SFN to be same as a corresponding at least one component of the SI of the first node other than the SFN in response to the SFN of the first and second nodes being the same. Moreover, any of these embodiments may further comprise signaling a capability information to the first node, the capability information indicating that the wireless device is capable of obtaining the SI of the second node by selectively performing at least one of the decoding, the receiving and the inferring in response to at least one criterion.

It will be understood that various embodiments were described above in terms of methods of obtaining SI of a second node of a wireless network for a wireless device that is communicating with a first node of the wireless network. Analogous embodiments may be provided for a wireless device and/or a node of a wireless network according to any of the embodiments described herein. Specifically, a wireless device may comprise a wireless transceiver that is configured to communicate with a first node of a wireless network and a processor that is configured to obtain SI of a second node of the wireless network in response to at least one criterion, to selectively perform any and all of the operations that were described above. Moreover, a first node of a wireless network may comprise a wireless transceiver and a processor that is configured to direct a wireless device that is communicating with the first node via the wireless transceiver to obtain SI of a second node of the wireless network by directing the wireless device in response to at least one criterion, to selectively perform any and all of the operations described above. In addition, the processor of the first node may be further configured to perform operations comprising transmitting and/or receiving wireless device capability information, the capability information indicating that the wireless device is capable of obtaining the SI of the second node by selectively performing at least one of the decoding, the receiving and the inferring in response to at least one criterion. The first node may be further configured to transmit the SI of the second node to the wireless device via the wireless transceiver in response to at least one criterion and in response to the received capability information.

A first node of a wireless network according to other embodiments described herein may comprise a wireless transceiver and a processor that is configured to perform operations comprising identifying a condition that may impact a wireless device that is communicating with the first node via the wireless transceiver from obtaining SI of a second node of the wireless network and transmitting the SI of the second node to the wireless device via the wireless transceiver in response to the identifying. In some operations, the transmitting is preceded by obtaining the SI of the second node. In other embodiments, the operations may further comprise identifying an SFN of the second node, and the transmitting comprises transmitting the SI of the second node to the wireless device via the wireless transceiver in response to the identifying and in further response to the SFN of the second node that was identified. In other embodiments, the transmitting the SI of the second node to the wireless device via the wireless transceiver is selectively performed in response to the SFN of the second node that was identified being different than that of the first node.

In still other embodiments, the operations may further comprise determining an accuracy of time synchronization of signals transmitted by the first and second nodes, a received time difference of signals at the wireless device from the first and second nodes and/or an accuracy of frequency synchronization of signals transmitted by the first and second nodes, and transmitting the SI of the second node to the wireless device via the wireless transceiver in response to the determining. In still other embodiments, the transmitting the SI of the second node to the wireless device via the wireless transceiver is selectively performed in response to the accuracy of time synchronization, the received time difference and/or the accuracy of frequency synchronization being less than their respective thresholds.

DETAILED DESCRIPTION

1 Introduction

Various embodiments described herein can provide systems, methods and devices for obtaining System Information (SI) of a second node of a wireless network for a wireless terminal that is communicating with a first node of the wireless network. Various embodiments described herein may be used, in particular with networks where enhanced receivers are used to handle high interference.

Various embodiments will now be described more fully hereinafter with reference to the accompanying drawings, in which examples of various embodiments are shown. This invention may, however, be embodied in many different forms and should not be construed as limited to the embodiments set forth herein. Rather, these embodiments are provided so that this disclosure will be thorough and complete, and will fully convey the scope of the present invention to those skilled in the art. It should also be noted that these embodiments are not mutually exclusive. Components from one embodiment may be tacitly assumed to be present/used in another embodiment.

For purposes of illustration and explanation only, these and other embodiments are described herein in the context of operating in a wireless network that communicates over radio communication channels with wireless terminals. It will be understood, however, that the present invention is not limited to such embodiments and may be embodied generally in any type of communication network. As used herein, a wireless device can include any device that receives data from a wireless communication network, and may include, but is not limited to, a mobile telephone ("cellular" telephone), laptop/portable computer, pocket computer, hand-held computer, desktop computer, a machine to machine (M2M) or MTC type device, a sensor with a wireless communication interface, etc.

Figure 1A:
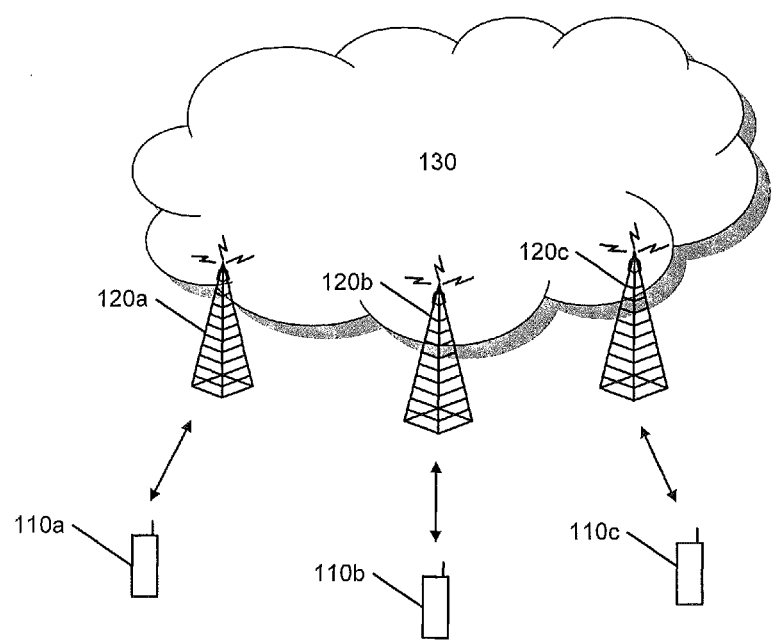
FIGS. 1A-1C are schematic diagrams of wireless networks that may be used with various embodiments described herein.

FIG. 1A is a block diagram of a wireless network that can be used in accordance with various embodiments described herein. Referring to FIG. 1A, the wireless network 130, which may also be referred to as a Radio Access Network (RAN), includes several nodes, such as first, second and third nodes 120a, 120b and 120c, respectively, connected thereto, using, for example, landlines and/or radio channels. First, second and third wireless devices 110a, 110b and 110c, respectively, are communicating with the first, second and third nodes 120a, 120b and 120c, respectively. It will be understood that a typical wireless network 130 may include many more nodes and wireless devices. Moreover, the nodes 120 may be arranged in a hierarchical or heterogeneous manner and/or may have overlapping coverage areas, as will be described in more detail below.

The Universal Mobile Telecommunications System (UMTS) is a third generation mobile communication system, which evolved from the Global System for Mobile Communications (GSM), and is intended to provide improved mobile communication services based on Wideband Code Division Multiple Access (WCDMA) technology. UTRAN, short for UMTS Terrestrial Radio Access Network, is a collective term for the Node B's and Radio Network Controllers which make up the UMTS radio access network. Thus, UTRAN is essentially a radio access network using wideband code division multiple access for UEs.

The Third Generation Partnership Project (3GPP) has undertaken to further evolve the UTRAN and GSM based radio access network technologies. In this regard, specifications for the Evolved Universal Terrestrial Radio Access Network (E-UTRAN) are ongoing within 3GPP. The Evolved Universal Terrestrial Radio Access Network (E-UTRAN) comprises the Long Term Evolution (LTE) and System Architecture Evolution (SAE).

Note that although terminology from 3GPP ($3^{rd}$ Generation Partnership Project) LTE (Long Term Evolution) may be used herein to exemplify various embodiments described herein, this should not be seen as limiting the scope of the invention to only these systems. Other wireless systems, including WCDMA (Wideband Code Division Multiple Access), WiMax (Worldwide Interoperability for Microwave Access), UMB (Ultra Mobile Broadband), HSDPA (High-Speed Downlink Packet Access), GSM (Global System for Mobile Communications), etc., may also benefit from exploiting various embodiments disclosed herein.

Prior to describing various embodiments, a technical overview of LTE will be provided to facilitate understanding of various embodiments described herein.

1.1 Technical Overview

The interest in deploying low-power nodes (such as pico base stations, home eNodeBs, relays, remote radio heads, etc.) for enhancing the macro network performance in terms of the network coverage, capacity and service experience of individual users has been increasing over the last few years. At the same time, there has been realized a need for enhanced interference management techniques to address the arising interference issues caused, for example, by a significant transmit power variation among different cells and cell association techniques developed earlier for more uniform networks.

In 3GPP, heterogeneous network deployments have been defined as deployments where low-power nodes of different transmit powers are placed throughout a macro-cell layout, which may also imply non-uniform traffic distribution. Such deployments are, for example, effective for capacity extension in certain areas, so-called traffic hotspots, i.e., small geographical areas with a higher user density and/or higher traffic intensity where installation of pico nodes can be considered to enhance performance. Heterogeneous deployments may also be viewed as a way of densifying networks to adopt for the traffic needs and the environment. However, heterogeneous deployments may also bring challenges for which the network has to be prepared to allow efficient network operation and superior user experience. Some challenges are related to the increased interference in the attempt to increase small cells associated with low-power nodes, also referred to as "cell range expansion". Other challenges may be related to potentially high interference in uplink due to a mix of large and small cells.

1.1.1 Heterogeneous Deployments

According to 3GPP, heterogeneous deployments are deployments where low power nodes are placed in a macro-cell layout. The interference characteristics in a heterogeneous deployment can be significantly different than in a homogeneous deployment, in the downlink or uplink or both. Examples hereof are given in FIG. 1B, where in node 120x, a macro user 110x with no access to the Closed Subscriber Group (CSG) cell will be interfered by the HeNodeB 120w; in node 120y a macro user 110y causes severe interference towards the HeNodeB 120w; and in node 120z, a CSG user 110z is interfered by another CSG HeNodeB 120y. In general, however, a heterogeneous deployment does not necessarily involve CSG cells.

1.1.1.1 Cell Range Expansion

Another challenging interference scenario occurs with so-called "cell range expansion", when the traditional downlink cell assignment rule may diverge from the Reference Signal Received Power (RSRP)-based approach, e.g., towards a pathloss- or pathgain-based approach, e.g., when adopted for cells with a transmit power lower than neighbor cells. The idea of the cell range expansion is illustrated in FIG. 1C, where the cell range expansion of a pico Base Station (BS) of a pico cell is implemented by means of a delta-parameter (Δ) and the UE potentially can see a larger pico cell coverage area when the delta-parameter is used in cell selection/reselection. The cell range expansion may be limited by the downlink (DL) performance since uplink (UL) performance typically improves when the cell sizes of neighbor cells become more balanced.

1.1.2 DL Interference Handling In Heterogeneous Deployments

To provide reliable and high-bitrate transmissions as well as robust control channel performance, maintaining a good signal quality is generally desired in wireless networks. The signal quality is determined by the received signal strength and its relation to the total interference and noise received by the receiver. A good network plan, which, among other aspects also includes cell planning, is desirable for the successful network operation, but it is static. For more efficient radio resource utilization, cell planning should be complemented at least by semi-static and dynamic radio resource management mechanisms, which are also intended to facilitate interference management, and/or deploying more advanced antenna technologies and algorithms.

One way to handle interference is, for example, to adopt more advanced transceiver technologies, e.g., by implementing interference cancellation mechanisms in wireless terminals. Another way, which can be complementary to the former, is to design efficient interference coordination algorithms and transmission schemes in the network. The coordination may be realized in static, semi-static or dynamic fashion. Static or semi-static schemes may rely on reserving time-frequency resources (e.g., a part of the bandwidth and/or time instances) that are orthogonal for strongly interfering transmissions. Dynamic coordination may be implemented, e.g., by means of scheduling. Such interference coordination may be implemented for all or specific channels (e.g., data channels or control channels) or signals.

Specifically for heterogeneous deployments, there have been standardized enhanced inter-cell interference coordination (eICIC) mechanisms for ensuring that the wireless device performs at least some measurements (e.g., Radio Resource Management (RRM), Radio Link Management (RLM), and Channel State Information (CSI) measurements) in low-interference subframes of the interfering cell. These mechanisms involve configuring patterns of low-interference subframes at transmitting nodes (and hereby reducing interference) and configuring measurement patterns for wireless terminals (and hereby indicating to the UEs low-interference measurement occasion).

Two types of patterns have been defined for eICIC to enable restricted measurements in DL:

Restricted measurement patterns, which are configured by a network node and signaled to the wireless device, and Transmission patterns (also known as Almost Blank Subframe (ABS) patterns), which are configured by a network node, describe the transmission activity of a radio node, and may be exchanged between the radio nodes.

1.1.2.1 DL Restricted Measurement Patterns

To enable restricted measurements for RRM (e.g., RSRP/RSRQ), RLM, CSI as well as for demodulation, the UE may receive via RRC UE-specific signaling the following set of patterns, Pattern 1: A single RRM/RLM measurement resource restriction for the serving cell.

Pattern 2: One RRM measurement resource restriction for neighbor cells (up to 32 cells) per frequency (currently only for the serving frequency).

Pattern 3: Resource restriction for CSI measurement of the serving cell with 2 subframe subsets configured per UE.

A pattern is a bit string indicating restricted and unrestricted subframes characterized by a length and periodicity, which are different for FDD and TDD (40 subframes for FDD and 20, 60 or 70 subframes for TDD).

Restricted measurement subframes are configured to allow the UE to perform measurements in subframes with improved interference conditions, which may be implemented by configuring Almost Blank Subframe (ABS) patterns at eNodeBs.

In addition to RRM/RLM, Pattern 1 may also be used to enable UE Rx-Tx measurements in low-interference conditions or in principle for any CRS-based measurement to allow improved measurement performance when the strong interference may be reduced by configuring low-interference subframes. Pattern 3 would typically be used for enhancing channel quality reporting, and allowing improved performance of channel demodulation and decoding (e.g., of data channels such as PDSCH, control channels such as PDCCH, PCFICH, PHICH). Pattern 1 and Pattern 2 may also be used for enabling low-interference conditions for common signals (e.g., PSS/SSS), common channels, and broadcast/multicast channels (e.g., PBCH), when the strong interference can be reduced or avoided (e.g., when a time shift is applied to ensure that the common channels/signals are interfered by data whose interference may be avoided by configuring low-interference subframes and hereby suppressing the interfering data transmissions).

The current standard in LTE Release 10 defines only intra-frequency restricted measurement patterns, although similar patterns may also be defined for UE inter-frequency measurements (e.g., inter-frequency cell search, RSRP, RSRQ, positioning measurements, etc.). This means the measurement pattern can be configured for measuring inter-frequency cells on each inter-frequency carrier. Similarly the measurement patterns can also be used for performing inter-RAT E-UTRAN measurements. In this case the cell on the serving RAT (e.g., UTRAN, GERAN, CDMA2000, HRPD, etc.) will configure the pattern enabling UE to perform inter-RAT E-UTRAN measurements (e.g., inter-RAT E-UTRAN cell search, RSRP, Reference Signal Received Quality (RSRQ), positioning measurements, etc.).

1.1.2.2 DL ABS Patterns

An ABS pattern indicates subframes when the eNodeB restricts its transmissions (e.g., does not schedule or transmits at a lower power). The subframes with restricted transmissions are referred to as ABS subframes. In the current LTE standard, eNodeBs can suppress data transmissions in ABS subframes but the ABS subframes cannot be fully blank—at least some of the control channels and physical signals are still transmitted. Examples of control channels that are transmitted in ABS subframes even when no data is transmitted are PBCH and PHICH. Examples of physical signals that have to be transmitted, disregard on whether the subframes are ABS or not, are cell-specific reference signals (CRS) and synchronization signals (PSS and SSS). Positioning reference signals (PRS) may also be transmitted in ABS subframes, If a Multicast/Broadcast over Single Frequency Network (MBSFN) subframe coincides with an ABS, the subframe is also considered as ABS. CRS are not transmitted in MBSFN subframes, except for the first symbol, which allows for avoiding CRS interference from an aggressor cell to the data region of a measured cell.

ABS patterns may be exchanged between eNodeBs, e.g., via X2, but these patterns are not signalled to the UE.

1.1.2.3 Aggressor Cell Information

In LTE Rel-11, for enhanced receivers (e.g., capable of interference cancellation), the information about a strongly interfering cell (also known as an "aggressor cell") may be provided to facilitate handling the strong interference generated by transmissions in that cell. The currently agreed information comprises the following information about the interfering cell: cell identification (PCI), number of CRS antenna ports, and the MBSFN configuration information.

1.1.3 Enhanced Receivers for Interference Handling

In UMTS/HSDPA several interference aware receivers have been specified for the UE. They are termed as "enhanced receivers" as opposed to the baseline receiver (rake receiver). The UMTS enhanced receivers are referred to as enhanced receiver type 1 (with two-branch receiver diversity), enhanced receiver type 2 (with single-branch equalizer), enhanced receiver type 3 (with two branch receiver diversity and equalizer) and enhanced receiver type 3i (with two branch receiver diversity and inter-cell interference cancellation capability). The new receivers can be used to improve performance, e.g., in terms of throughput and/or coverage.

In LTE Rel-10, enhanced interference coordination techniques have been developed to mitigate potentially high interference, e.g., in a cell range expansion zone, while providing the UE with time-domain measurement restriction information. Further, for LTE Rel-11, advanced receivers based on Minimum Mean Square Error—Interference Rejection Combining (MMSE-IRC) with several covariance estimation techniques and interference-cancellation-capable receivers are being currently studied. In the future, even more complex advanced receivers such as Minimum Mean Square Error-Successive Interference Cancellation (MMSE-SIC), which is capable of performing nonlinear subtractive-type interference cancellation, can be used to further enhance system performance.

Such techniques generally may benefit all deployments where relatively high interference of one or more signals is experienced when performing measurements on radio signals or channels transmitted by radio nodes or devices, but are particularly useful in heterogeneous deployments.

However, these techniques involve also additional complexity, e.g., may require more processing power and/or more memory. Due to these factors such receiver may be used by the UE for mitigating interference on specific signals or channels. For example a UE may apply an interference mitigation or cancellation technique only on data channel. In another example a more sophisticated UE may apply interference mitigation on data channel as well as on one or two common control signals; examples of common control signals are reference signal, synchronization signals, etc.

It should be noted that the terms "interference mitigation receiver", "interference cancellation receiver", "interference suppression receiver", "interference rejection receiver", "interference aware receiver", "interference avoidance receiver", etc. are interchangeably used but they all belong to a category of an "advanced receiver" or an "enhanced receiver". All these different types of advanced receiver can improve performance by fully or partly eliminating the interference arising from at least one interfering source. The interfering source is generally the strongest interferer(s), which are signals from the neighboring cells when the action is performed in the UE. Therefore a more generic term, "enhanced receiver", which covers all variants of advanced receiver, is used hereinafter. Further, the corresponding interference handling techniques (e.g., interference cancellation, interference suppression, puncturing or interference rejection combining) for enhanced receivers are termed "enhanced receiver techniques" herein.

1.1.4 System Information (SI)

1.1.4.1 System Information

In LTE, the system information is divided into the MasterInformationBlock (MIB) and a number of SystemInformationBlocks (SIBs):

MasterInformationBlock defines the most essential physical layer information of the cell required to receive further system information; parameters:
dl-Bandwidth
phich-Config
systemFrameNumber SystemInformationBlockType1 contains information relevant when evaluating if a UE is allowed to access a cell and defines the scheduling of other system information blocks; selected parameters:
plmn-IdentityList
trackingAreaCode
cellIdentity within PLMN
CSG indication, CSG ID
cellSelectionInfo (intraFreqReselection (yes/no), q-RxLevMin, q-RxLevMinOffset, q-QualMin, q-QualMinOffset)
p-Max (maximum UE power allowed per cell)
freqBandIndicator
schedulingInfoList, si-WindowLength, si-Periodicity, sib-Mapping
tdd-Config SystemInformationBlockType2 contains common and shared channel information; selected parameters:
radioResourceConfigCommon
ue-TimersAndConstants
freqInfo (ul-CarrierFreq, ul-Bandwidth, additionalSpectrumEmission)
mbsfn-SubframeConfigList
timeAlignmentTimerCommon (for TA)

SystemInformationBlockType3 contains cell re-selection information, mainly related to the serving cell;

SystemInformationBlockType4 contains information about the serving frequency and intra-frequency neighboring cells relevant for cell re-selection (including cell re-selection parameters common for a frequency as well as cell specific re-selection parameters);

SystemInformationBlockType5 contains information about other E UTRA frequencies and inter-frequency neighboring cells relevant for cell re-selection (including cell re-selection parameters common for a frequency as well as cell specific re-selection parameters);

SystemInformationBlockType6 contains information about UTRA frequencies and UTRA neighboring cells relevant for cell re-selection (including cell re-selection parameters common for a frequency as well as cell specific re-selection parameters);

SystemInformationBlockType7 contains information about GERAN frequencies relevant for cell re-selection (including cell re-selection parameters for each frequency);

SystemInformationBlockType8 contains information about CDMA2000 frequencies and CDMA2000 neighboring cells relevant for cell re-selection (including cell re-selection parameters common for a frequency as well as cell specific re-selection parameters);

SystemInformationBlockType9 contains a home eNodeB name (HNB name);

SystemInformationBlockType10 contains an ETWS primary notification;

SystemInformationBlockType11 contains an ETWS secondary notification;

SystemInformationBlockType12 contains a CMAS warning notification;

SystemInformationBlockType13 contains MBMS-related information.

The UE may need to acquire at least the following SI:

RRC IDLE: MIB, SIB1, SIB2-SIB8 (depending on the support of concerned RAT);

RRC CONNECTED: MIB, SIB1, SIB2, SIB8 (if cdma200 is supported).

1.1.4.1.1 Obtaining SI

The MIB is mapped on the BCCH and carried on BCH while all other SI messages are mapped on the BCCH and dynamically carried on DL-SCH where they can be identified through the SI-RNTI (System Information RNTI). Both the MIB and SystemInformationBlockType1 use a fixed schedule with a periodicity of 40 and 80 ms respectively, and in subframes #0 and subframes #5, respectively. To allow improved detection performance, 3 redundancy versions are also signalled (e.g., for MIB, every new transmission occurs every 40 ms, followed by 3 redundancy versions with 10 ms period).

The scheduling of other SI messages (e.g., periodicity and SI-window) is flexible and indicated by SystemInformationBlockType1. Each SIB is contained only in a single SI message, only SIBs having the same scheduling requirement (periodicity) can be mapped to the same SI message. There is also a limit on the maximum size of a SI message (217 bytes with DCI format 1C and 277 bytes with 1a format).

The Paging message is used to inform UEs in RRC_IDLE and UEs in RRC_CONNECTED about a system information change.

System information may also be provided to the UE by means of dedicated signaling, e.g., upon handover.

The obtained SI is stored by the UE and considered invalid after 3 hours.

1.1.4.1.2 SI Reading Use Cases

The UE may read the SI transmitted over PBCH channel for multiple purposes.

Reading at least MIB and SIB1 is necessary, e.g., for acquiring CGI, which uniquely identifies a cell, which may be requested by the serving cell. The UE may be requested to report CGI for a specific purpose, e.g., verification of CSG cell which becomes particularly important in heterogeneous network deployments, MDT measurement reporting, establishment of SON, ANR, etc.

In another example, the UE may be required to read SI of a target cell prior to performing a cell change. Examples of cell change are cell reselection, handover, RRC connection re-establishment, RRC connection release with redirection, PCell change in CA, PCC change in PCC, etc. For example, prior to cell change the UE may have to read the MIB of a target cell to acquire its system frame number (SFN). The SFN is then used for example to determine the frame of the target cell in which random access (RA) can be transmitted for accessing this cell. The RA configuration of the target cell is provided to the UE by its serving cell in a cell change command.

1.1.4.1.3 SI reading related requirements

The UE may make autonomous gaps in downlink reception and uplink transmission for receiving MIB and SIB 1 message.

CGI: With no explicit neighbor list provided to the UE, UE shall identify and report the CGI of a new E-UTRA cell, when requested by the network for the purpose 'reportCGI', within 150 ms for the target cell SINR≥−6 dB and SINR≥−4 dB for intra-frequency and inter-frequency, respectively.

RLM: Recently, there has also been specified a requirement for reading by a UE a new-cell CGI (on the same or other frequency or RAT) in parallel to RLM measurements performed by the UE in subframes indicated by a measurement resource restriction pattern.

Demodulation PBCH requirements

The requirements apply for non-DRX and for all DRX cycles.

1.1.4.2 System Information in multi-carrier networks

The UE applies the system information acquisition and SI-change monitoring procedures for the PCell only. For SCells, E-UTRAN provides, via dedicated signaling, all system information relevant for operation in RRC_CONNECTED when adding the SCell.

In CA the SFN are the same on PCell and SCells therefore UE does not have to read the SI of the target cell, e.g., when changing the PCell change or SCell.

1.1.5 Multi-Carrier or Carrier Aggregation Concept

To enhance peak rates within a technology, multi-carrier or carrier aggregation solutions may be used. Each carrier in multi-carrier or carrier aggregation system is generally termed as a component carrier (CC) or sometimes it is also referred to as a cell. In simple words, the component carrier (CC) means an individual carrier in a multi-carrier system. The term carrier aggregation (CA) is also called (e.g., interchangeably called) "multi-carrier system", "multi-cell operation", "multi-carrier operation", "multi-carrier" transmission and/or reception. This means the CA is used for transmission of signaling and data in the uplink and downlink directions. One of the CCs is the primary component carrier (PCC) or simply primary carrier or even anchor carrier. The remaining ones are called secondary component carrier (SCC) or simply secondary carriers or even supplementary carriers. Generally the primary or anchor CC carries the essential UE specific signaling. The primary CC exists in both uplink and direction CA. The network may assign different primary carriers to different UEs operating in the same sector or cell.

Therefore the UE has more than one serving cell in downlink and/or in the uplink: one primary serving cell and one or more secondary serving cells operating on the PCC and SCC respectively. The serving cell is interchangeably called as "primary cell" (PCell) or "primary serving cell" (PSC). Similarly the secondary serving cell is interchangeably called as "secondary cell" (SCell) or "secondary serving cell" (SSC). Regardless of the terminology, the PCell and SCell(s) enable the UE to receive and/or transmit data. More specifically, the PCell and SCell exist in DL and UL for the reception and transmission of data by the UE. The remaining non-serving cells on the PCC and SCC are called neighbor cells.

The CCs belonging to the CA may belong to the same frequency band (also known as intra-band CA) or to different frequency band (inter-band CA) or any combination thereof (e.g., 2 CCs in band A and 1 CC in band B). Furthermore, the CCs in intra-band CA may be adjacent or non-adjacent in frequency domain (also known as intra-band non-adjacent CA). A hybrid CA comprising of any two of intra-band adjacent, intra-band non-adjacent and inter-band is also possible. Using carrier aggregation between carriers of different technologies is also referred to as "multi-RAT carrier aggregation" or "multi-RAT-multi-carrier system" or simply "inter-RAT carrier aggregation". For example, the carriers from WCDMA and LTE may be aggregated. Another example is the aggregation of LTE FDD and LTE TDD, which may also be interchangeably called as multi-duplex carrier aggregation system. Yet another example is the aggregation of LTE and CDMA2000 carriers. For the sake of clarity the carrier aggregation within the same technology as described can be regarded as "intra-RAT" or simply "single RAT" carrier aggregation.

The CCs in CA may or may not be co-located in the same site or radio network node (e.g., radio base station, relay, mobile relay, etc.). For instance the CCs may originate (i.e., transmitted/received) at different locations (e.g., from non-located base stations, or from base stations and Remote Radio Head (RRH), or at Remote Radio Units (RRUs)). Examples of combined CA and multi-point communication include Distributed Antenna System (DAS), RRH, RRU, Coordinated Multi-Point (CoMP), multi-point transmission/reception, etc. Various embodiments described herein may also be applied to multi-point carrier aggregation systems as well as multi-point systems without CA. A transmitter node in a COMP, DAS or multiflow systems is interchangeably called as a transmission point (TP). The multi-carrier operation may also be used in conjunction with multi-antenna transmission. For example signals on each CC may be transmitted by the eNodeB to the UE over two or more antennas. The embodiments apply to each CC in CA or combination of CA and CoMP scenario.

1.1.6 Frequency Error In Transmitter Nodes

The carrier frequency on which the base station (BS) or any radio node transmits signals on a cell may incorporate frequency error due to RF impairments.

Frequency error is the measure of the difference between the actual base station or radio node transmitted frequency and the assigned frequency. The same source is generally used for RF frequency and data clock generation.

The modulated carrier frequency of each E-UTRA carrier configured by the BS is within the accuracy range given in Table 1 observed over a period of one subframe in LTE (1 ms). The same requirements apply to multi-standard radio (MSR) base station or radio node supporting LTE. The relative frequency error between any two radio nodes is generally the sum of individual frequency error, e.g., relative frequency error between two local area base stations will be ±0.2 ppm.

TABLE 1

Frequency error minimum requirement
[3GPP TS 36.104, Table 6.5.1-1]

| BS class | Accuracy |
| --- | --- |
| Wide Area BS | ±0.05 ppm |
| Local Area BS | ±0.1 ppm |
| Home BS | ±0.25 ppm |

1.2 Problems Addressed

At least the following problems may arise in the systems described above:

In high interference conditions, it may be difficult for the UE to decode the PBCH and hence the MIB.

Inability to read MIB implies no information about DL bandwidth, PHICH configuration and SFN.

Using enhanced receivers for reading PBCH (MIB) is being discussed in the context of heterogeneous deployments in 3GPP; this, however, has an impact on UE power consumption and complexity and has limited or no gain in certain scenarios.

If MIB cannot be read, then there exists the possibility at cell change to send the UE MIB information from the serving cell prior to the change.

Using signaling (e.g., via another network node (e.g., aggressor eNodeB) involving X2) may be not always efficient due to signaling overhead, security reasons, the complexity of exchanging certain types of information between network nodes, etc.

Inability to read SIB 1 leads to a failure.

Inability to read SIB2 leads to a failure.

Obtaining SIB2 may be not necessary when inter-frequency cell reselection is expected.

2 Brief Summary Of The Embodiments

Various embodiments described herein can be implemented in the form of at least the following example embodiments:

A method in a first network node 120a serving at least one wireless device 110a, the method comprising:

Determining at least one criterion or condition, which affects the obtaining of the SI of a second network node 120b directly from the node 120b by the said wireless device 110a, Signaling the SI of the said second network node 120b to the wireless device 110a depending on the determined condition or criterion, e.g., if condition is not met, The device 110a assuming a certain pre-defined relation (e.g., the same) between some components of the SI of the first 120a and second 120b nodes if the condition is not met and signaling of the SI components is not provided.

Analogous systems, nodes and devices may be provided.

A method in a first network node 120a serving at least one wireless device 110a, the method comprising:

Determining the SFN of a second network node 120b whose SI will be obtained by the said wireless device 110a, Signaling the SI of the said second network node 120b to the wireless device 110a depending upon the determined SFN, e.g., if the determined SFN is not synchronized to its own SFN.

Analogous systems, nodes and devices may be provided.

A method in a wireless device 110a served by a first network node 120a, the method comprising:

Determining at least one criterion or condition, which affects the obtaining of the SI of a second network node 120b by the said wireless device 110a, Obtaining the SI of the said second network node 120b by selecting:

"Method 1", which comprises decoding one or more channels of the said second network node 120b, or "Method 2", which comprises receiving the SI of the said second network node 120b from or via the said first network node 120a, or "Method 3", which comprises the device assuming a certain relation pre-defined relation (e.g., they are the same) between at least some components of the SI of the second network node 120b with respect to the first network node 120a.

Combination of and selection between any of the 2 or more of method 1, method 2, and method 3.

Wherein the said selecting is based on the determined or more criterion (e.g., SINR of the second network node) or a pre-defined rule.

Analogous systems, nodes and devices may be provided.

3 Detailed Description Of The Embodiments

A "radio node" is characterized by its ability to transmit and/or receive radio signals and it comprises at least a transmitting or receiving antenna. A radio node may be a UE or a radio network node (see corresponding descriptions).

A "wireless device" and "UE" are used interchangeably in the description. A UE may comprise any device equipped with a radio interface and capable of at least transmitting or receiving a radio signal from another radio node. A UE may also be capable of receiving signal and demodulate it. Note that even some radio network nodes, e.g., femto BS (also known as home BS), may also be equipped with a UE-like interface. Some example of "UE" that are to be understood in a general sense are PDA, laptop, mobile, a tablet device, sensor, fixed relay, mobile relay, any radio network node equipped with a UE-like interface (e.g., small RBS, eNodeB, femto BS).

A "radio network node" is a radio node comprised in a radio communications network. A radio network node may be capable of receiving radio signals or transmitting radio signals in one or more frequencies, and may operate in single-RAT, multi-RAT or multi-standard mode (e.g., MSR). A radio network node, including eNodeB, RRH, RRU, or transmitting-only/receiving-only radio network nodes, may or may not create own cell. Some examples of radio network nodes not creating own cell are beacon devices transmitting configured radio signals or measuring nodes receiving and performing measurements on certain signals (e.g., LMUs). It may also share a cell or the used cell ID with another radio node which creates own cell, it may operate in a cell sector or may be associated with a radio network node creating own cell. More than one cell or cell sectors (commonly named in the described embodiments by a generalized term "cell" which may be understood as a cell or its logical or geographical part) may be associated with one radio network node. Further, one or more "serving cells" (in DL and/or UL) may be configured for a UE, e.g., in a carrier aggregation system where a UE may have one Primary Cell (PCell) and one or more Secondary Cells (SCells). A cell may also be a virtual cell (e.g., characterized by a cell ID but not provide a full cell-like service) associated with a transmit node.

A "network node" may be any radio network node (see the corresponding description) or core network node. Some non-limiting examples of a network node are an eNodeB (also radio network node), RNC, positioning node, MME, PSAP, SON node, MDT node, coordinating node, a gateway node (e.g., P-GW or S-GW or LMU gateway or femto gateway), and O&M node.

The term "coordinating node" used herein is a network and/or node, which coordinates radio resources with one or more radio nodes. Some examples of the coordinating node are network monitoring and configuration node, OSS node, O&M, MDT node, SON node, positioning node, MME, a gateway node such as Packet Data Network Gateway (P-GW) or Serving Gateway (S-GW) network node or femto gateway node, a macro node coordinating smaller radio nodes associated with it, eNodeB coordinating resources with other eNodeBs, etc.

The "signaling" described in the present disclosure is either via direct links or logical links (e.g., via higher layer protocols and/or via one or more network and/or radio nodes). For example, signaling from a coordinating node to a UE may also pass another network node, e.g., a radio network node.

The described embodiments are not limited to LTE, but may apply with any Radio Access Network (RAN), single- or multi-RAT. Some other RAT examples are LTE-Advanced, UMTS, HSPA, GSM, cdma2000, WiMAX, and WiFi.

The described embodiments may also be applied to multi-point transmission and/or reception systems, carrier aggregation systems, and multi-point carrier aggregation systems.

The term "subframe" used in the embodiments described herein (typically related to LTE) is an example resource in the time domain, and in general it may be any pre-defined time instance or time period.

"Enhanced receiver" is a receiver implementing any of the embodiments described herein or implementing a receiver interference handling technique (e.g., interference cancellation, interference suppression, interference rejection, etc.). In some embodiments, "receiver type" may be used interchangeably with "receiver technique".

The term "victim" may apply, e.g., to a measured signal or a measured cell (depending on the context), the measurements of which are preformed in high-interference conditions.

The term "aggressor" may apply, e.g., to a strongly interfering signal or a strongly interfering cell (depending on the context), which interferers to the victim.

Some examples of "victim-aggressor" relations: an LTE physical signal to an LTE physical signal (of the same or different type) or to an LTE physical channel, an LTE physical channel to an LTE physical channel (of the same or different type) or an LTE physical signal, a macro cell or its UE interfering to a pico cell or the pico UE, a femto cell or a CSG UE interfering to a non-CSG cell or non-SCG UE, etc.

Figure 2:
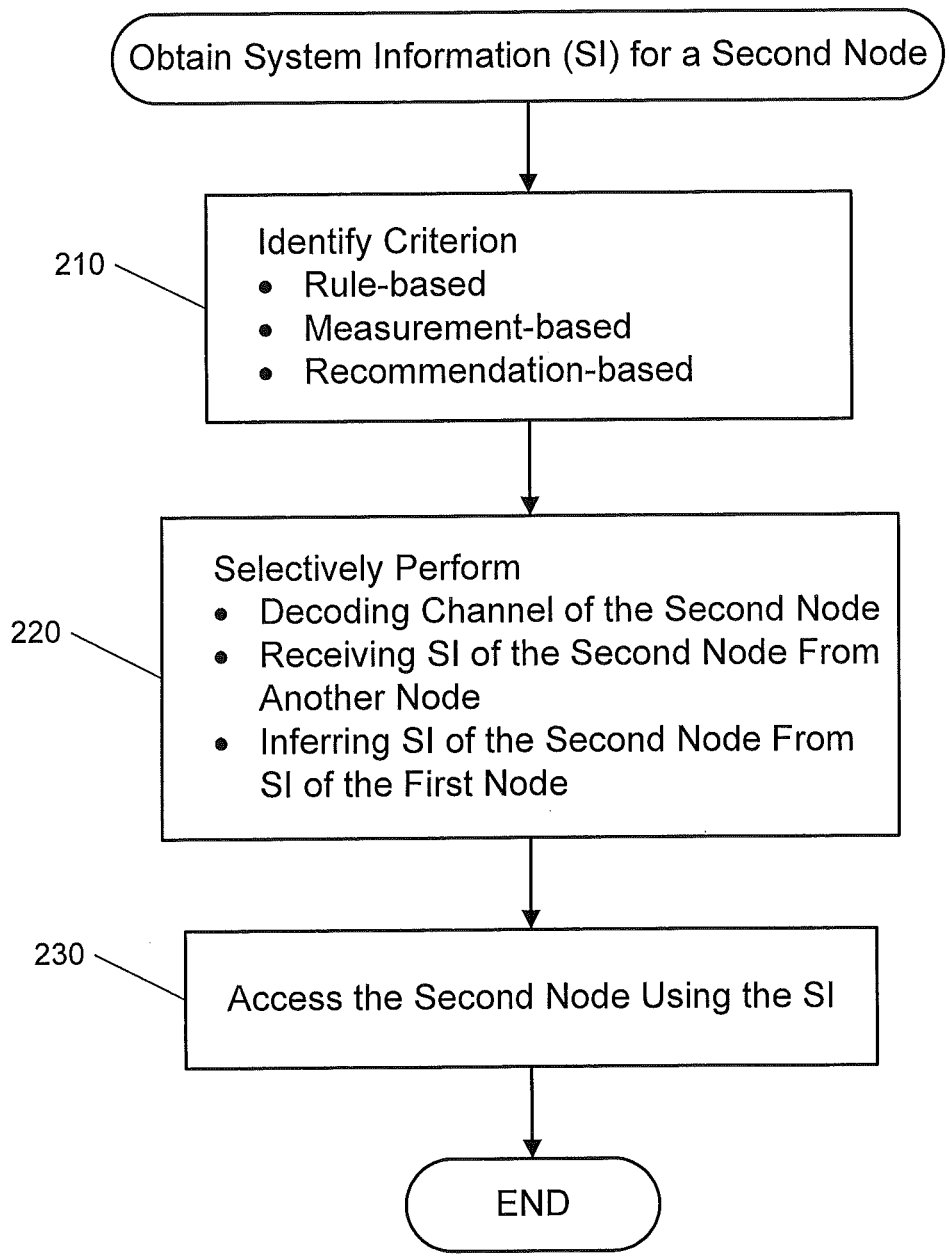
FIGS. 2-12 are flowcharts of operations that may be performed to obtain system information according to various embodiments described herein.

3.1.1 Systems/Methods In A Wireless Device For Enabling A Hybrid Approach For Obtaining SI It is possible for the UE to acquire SI of a cell either using method 1 or method 2 or method 3, e.g., always or statically configured. However, various embodiments described herein may comprise a hybrid system/method to enable the UE to obtain the SI of a cell. The hybrid system/method allows to selectively perform at least any one or more of method 1, method 2 and method 3 for obtaining the SI of a cell. More specifically, as illustrated in FIG. 2, the disclosed hybrid system/method enables the UE to obtain the said SI by using or adaptively selecting between any method of a combination of at least two of method 1, method 2, and method 3, (Block 220) depending on one or more criteria, (Block 210) and then to use the SI that was obtained to access the node (Block 230). These details are described in subsequent sections by means of examples. Note that the embodiments can be generalized for any number (>1) and any set of methods of obtaining SI.

In a non-limiting example, the three methods of SI obtaining method 1 and SI obtaining method 2 are defined as follows:

SI obtaining method 1: In this case SI is obtained by the UE by decoding at least one channel which transmits the SI, e.g., by decoding PBCH which carries MIB, decoding PDSCH which carries SIBs, etc. (First bullet of Block 220.)

SI obtaining method 2: In this case SI is obtained by the UE, at least partly, by receiving a signaling from another node. (Second bullet of Block 220.)

SI obtaining method 3: In this case, if the UE does not receive some or all components of the SI by means of method 1 or method 2, then the UE assumes a certain relation between the said components of the SI of different cells (e.g., the components do not differ between the cell for which the UE intends to obtain SI and the current cell). (Third bullet of Block 220.)

3.1.1.1 Receiving Mechanism Comprised In SI Obtaining Method 1

In method 1 the UE may use a suitable receiver type for acquiring the SI of a cell by decoding a suitable channel. Examples of receive types are:

Receiver mechanism type 1a (e.g., minimum-complexity receiver such as legacy receiver), Receiver mechanism type 1b (e.g., medium-complexity enhanced receiver capable of operating in higher-interference conditions, compared to the minimum complexity receiver, but dependent on network assistance for handling the interference such as using restricted measurement subframes), Receiver mechanism type 1c (e.g., high-complexity enhanced receiver capable of operating in higher-interference conditions, compared to the medium-complexity receiver, and capable, e.g., of interference cancellation of signals associated with SI such as PBCH).

3.1.1.2 Receiver Mechanism Comprised In SI Obtaining Method 2

In method 2 different receiver mechanisms to obtain the SI of the target cell from or via another node can be employed by the UE. Examples of receiving mechanism are:

Receiver mechanism 2a (e.g., a receiver obtaining SI, at least in part, via signaling from another node), Receiver mechanism 2b (e.g., acquiring or deducing the SI data from an internal/external database and/or historical data, said SI earlier received from or via another node).

Some examples of the "another node" are a radio network node (e.g., eNodeB), a network node (e.g., a coordinating node), and another wireless device.

3.1.1.3 Receiver Mechanism Comprised In SI Obtaining Method 3

In method 3 the UE exploits a certain relation (e.g., said relation is a pre-defined or pre-configured relation or a relation determined by a pre-defined rule). Based on this relation, knowing at least one of the SI components of a cell, the UE determines at least one other SI component (e.g., a similar SI component of another cell or another SI component of the same cell).

The UE may determine that it can or shall not obtain some or all components of SI via method 1, and also is not provided some or all SI via another node. In this method, the UE may assume that those components of SI that it has not obtained via methods 1 and 2 are the same as in its current serving cell. In another example, when the SFN is the same for cell 1 and cell 2, the UE may assume that at least one other SI component of another type (e.g., PHICH configuration, SIB1, etc.) are also the same.

One example of the SI data is SFN information. The SI data may also comprise system BW, number of transmit antennas, etc.

The adaptation may be decided by the device, by a network node, or by both (jointly or in uncoordinated way). In one example, the wireless device may decide that SI should be obtained via decoding and/or via signaling SI and/or via implication (e.g., exploiting a certain relation) of SI or its part to the wireless device. The wireless device may also inform about its adaptation decision the network node, e.g., by means of a request for SI, the request sent to the network node which may then provide the requested SI or may not provide SI such that the device needs to imply SI. In another example, the network node may decide that SI should be obtained via decoding and/or via signaling SI and may also inform (explicitly or implicitly) the wireless device about its decision, e.g., implicitly notifying by configuring a pattern or a parameter to be used by the device when reading SI. In yet another example, a wireless device may decide to read certain parts of SI and network node may decide to provide to the device certain parts of SI, and some parts of the SI may be implied, where the parts decoded by the wireless device may or may not be overlapping with the parts provided by the network node. The overlap may be also be intended, for increasing reliability of the final SI collected from the parts by the wireless device.

3.1.1.4 Adaptive Combining And/Or Selection Of Multiple Methods

Embodiments in this section describe adaptive combining and/or selection among at least two methods, e.g., at least among two methods of method 1, method 2, and method 3. In some embodiments, a hybrid use may also take place comprising combining and selection, e.g., simultaneous (combined) use of a first method selected from a first set of methods and a second method selected from a second set of methods; or adaptive selection between using method 3 and the combined use of method 1 and method 2.

According to some embodiments, the wireless device obtains SI by adaptively combining at least two methods. The combining may comprise simultaneous use of the at least two methods and/or adaptive selection of one or more methods from a larger set of (supported) methods. For example, according to some embodiments, the wireless device obtains SI by means of adaptively selected one or more methods, selected among method 1, method 2 and method 3 based on one or more criteria or conditions.

The adaptive selection may also enable adaptation of receiver mechanism used within the selected or adaptive method (e.g., dynamically selecting Receiver mechanism type 1a or Receiver mechanism type 2a). The selection may also comprise a fallback procedure (e.g., method 3 is used when method 1 and/or method 2 cannot be used for some, reason or in some condition).

The selection may be based on one or more of the following:

According to a pre-defined rule or a fallback procedure (e.g., try method B if failed with method A or there is a high probability of failing with method A). (First Bullet of Block 210.)

Based on historical data and/or statistics collected in the wireless device (e.g., a self-learning receiver which may adapt to different environments). (Second Bullet of Block 210.)

As an informed choice (e.g., indicated or recommended by another network node). (Third bullet of Block 210.)

Figure 3:
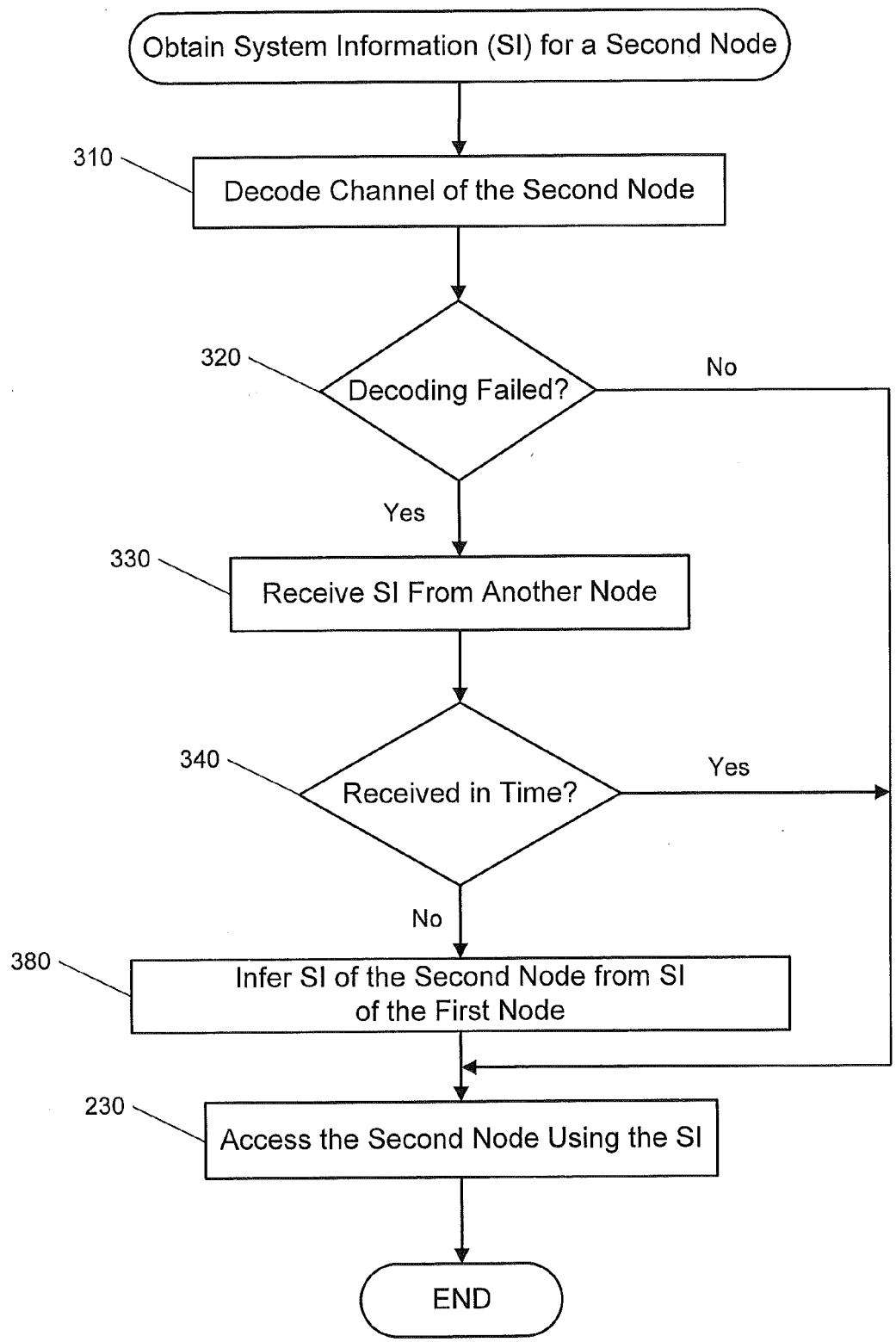

One example of a predefined rule is illustrated in FIG. 3. Referring to FIG. 3, an attempt is made at Block 310 to decode a channel of a second node, which may correspond to the first bullet of Block 220. If the decoding fails at Block 320, then an attempt is made to receive the SI from another node at Block 330, which may correspond to the second bullet of Block 220. If the SI is not received in time at Block 340, then the SI of the second node is inferred from the SI of the first node at Block 380, which may correspond to the third bullet at Block 220. Whether by decoding at Block 320, by receiving SI from another node at Block 340, or by inferring SI at Block 380, the second node is accessed at Block 230 using the SI that was obtained. Accordingly, FIG. 3 illustrates a rule that comprises performing the receiving if the decoding fails, and performing the inferring if the receiving is not performed within a given time.

Figure 4:
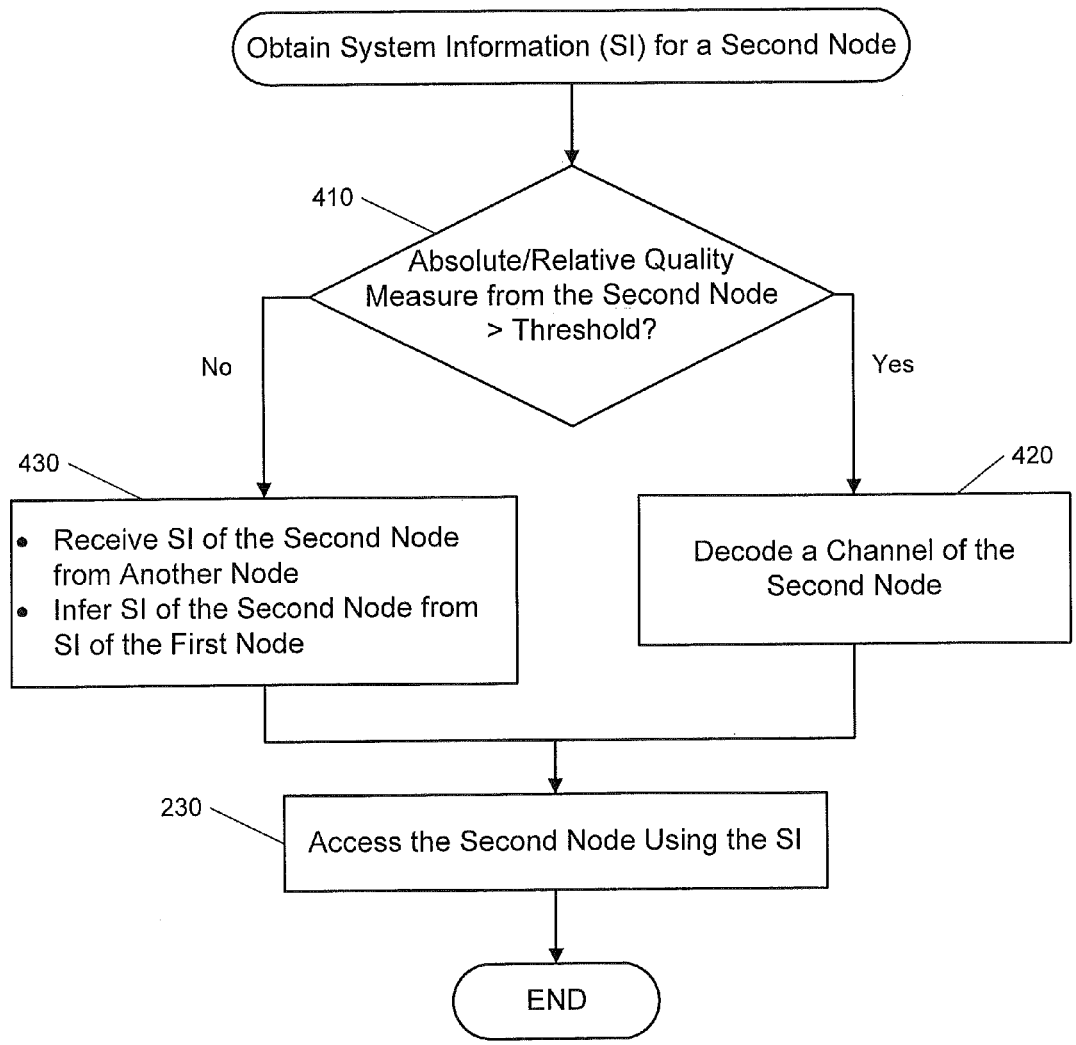

In other embodiments, a pre-defined rule may comprise a selection based on condition or a criteria, e.g., based on one or more of:

An absolute or a relative quality measure of one or more signals of the target cell (the cell for which SI is to be obtained), e.g., SINR, SNR, Es/Iot, Es/Noc, RSRQ, BLERv, etc., as illustrated in FIG. 4. For example:

Select method 1 (Block 420) for obtaining the SI of a target cell when the quality measure of the said target cell is above a threshold (Block 410), e.g., SNR>−4 dB, otherwise select method 2 or 3 (Block 430) for the said obtaining of the SI.

Figure 5:
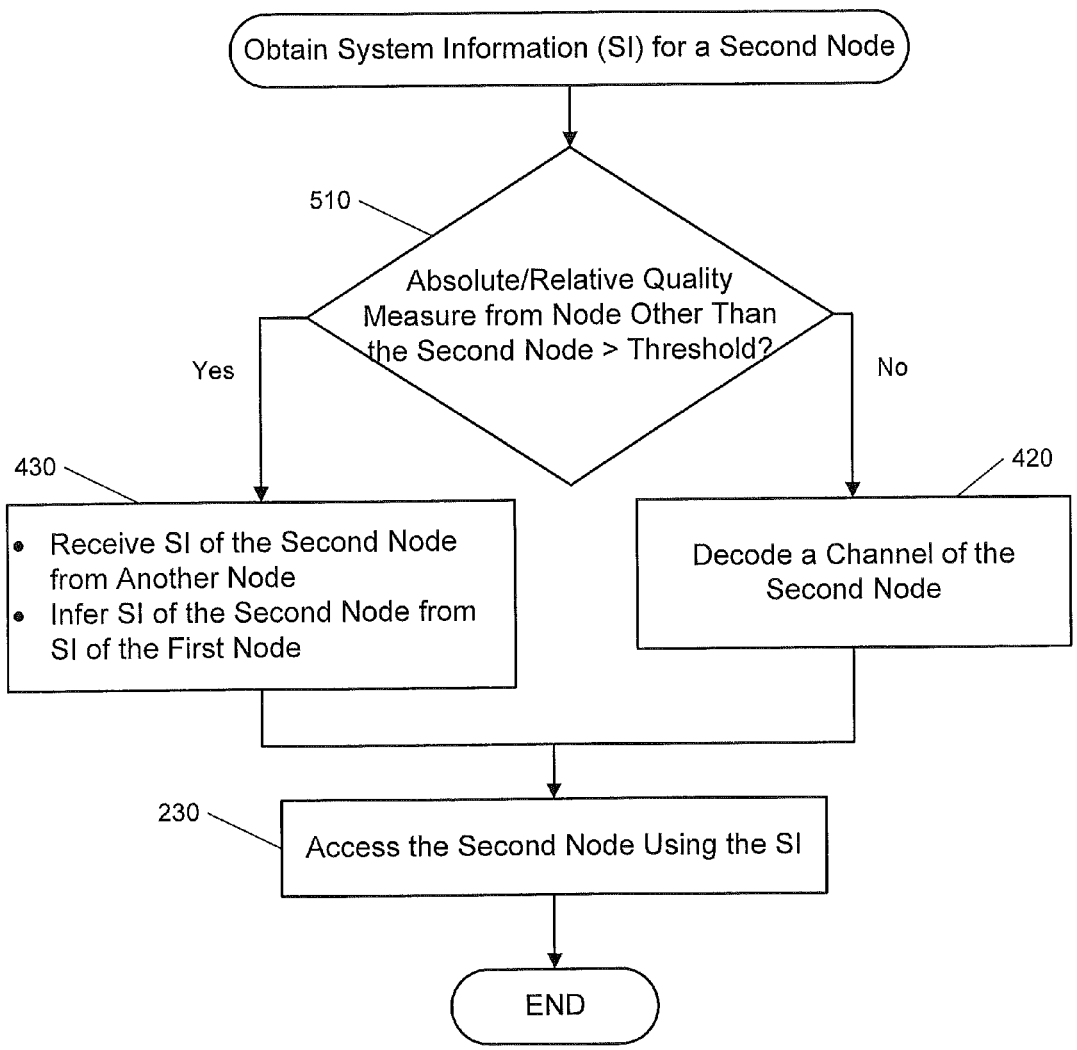

An absolute or a relative quality measure of one or more signals of the interfering cell (also known as aggressor cell), e.g., SINR, SNR, Es/Iot, Es/Noc, etc., as illustrated in FIG. 5. For example:
  Select method 2 or 3 (Block 430) for obtaining the SI of a target cell when the quality measure of the interfering cell is below a threshold (Block 510), e.g., SNR<3 dB, otherwise select method 1 (Block 420) for the said obtaining of the SI.

Figure 6:
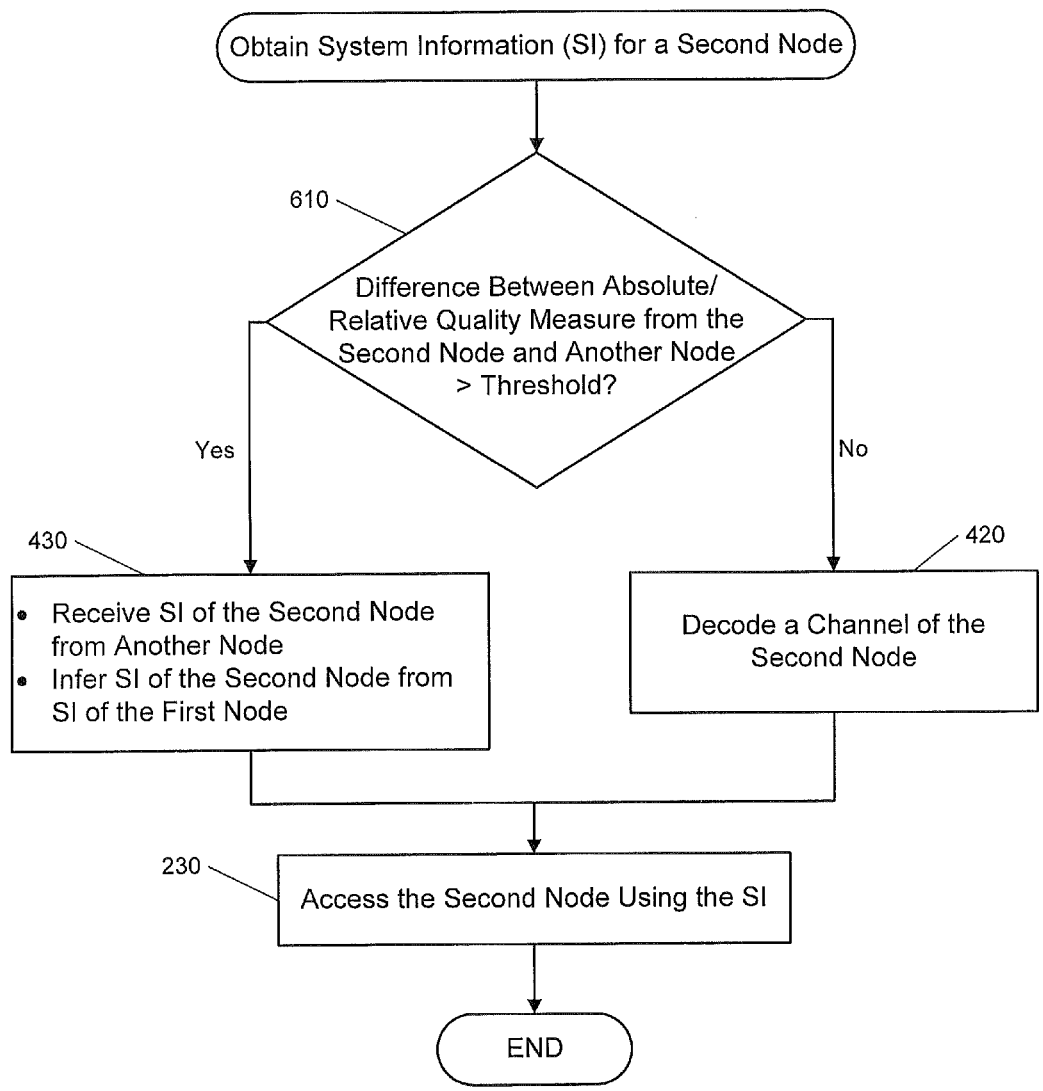

Relative difference between a signal measure of the target cell and a signal measure of the interfering cell, as illustrated in FIG. 6. For example:
  Select method 1 (Block 420) for obtaining the SI of a target cell when the absolute difference is below a threshold (Block 610), e.g., (SNR1-SNR0) <6 dB, otherwise select methods 2 or 3 (Block 430).

Figure 7:
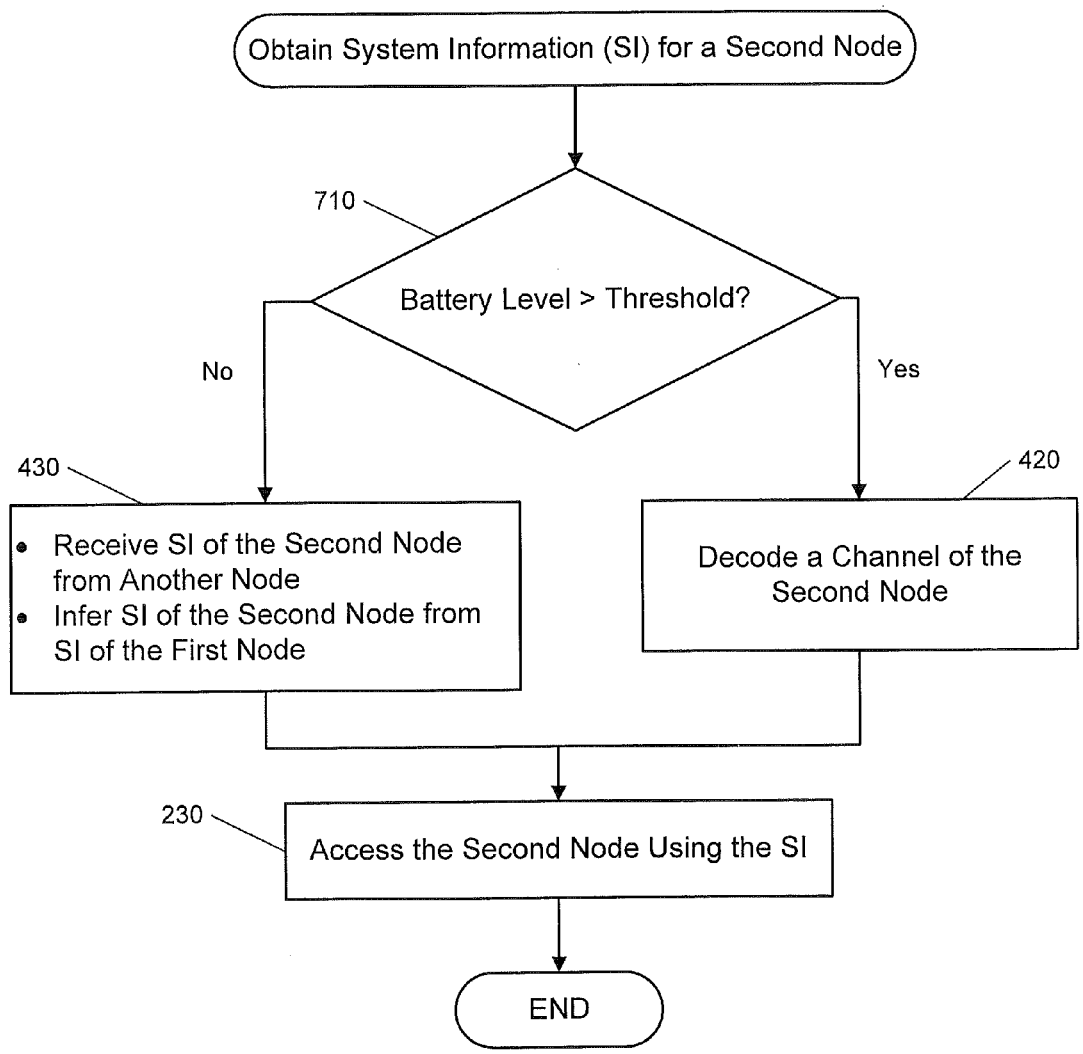

Battery level of the wireless device, as illustrated in FIG. 7. For example:
  Select a method 1 (Block 420) when the battery level is above a threshold
(Block 710) otherwise select method 2 or 3 (Block 430) when UE battery is drained more when method 1 is used for obtaining the SI of the target cell. In one example, the relation between the battery level impact or power consumption impact and each of methods 1, 2, or 3 is defined based on a pre-defined rule or pre-configured.
  Power consumption characteristic (e.g., an index or relative estimate) associated with a receiver type:
    Select the method (e.g., method 1, 2, or 3) and the receiver type associated with the method (e.g., Receiver mechanism type la or Receiver mechanism type lb) to minimize the power consumption.
  Wireless device category (e.g., a low-cost or a high-end device, a mobile or a laptop), e.g.,
    Method 2 or 3 may be selected for smaller devices and less powerful devices.
  Measurement bandwidth, e.g.,
    Method 2 or 3 may be selected for smaller bandwidths since the channel estimation and the decoding quality are typically worse with a lower bandwidth.
  Number of strong interferers.
  Location information, a timing measurement (e.g., TA or RSTD) or any measurement indicative of a location of the wireless device or distance of the wireless device to the aggressor and/or measured node.
  Purpose of using the SI (see use case of using described above).
  Frequency information (EARFCN, same/different frequency, same/different frequency band, same/different carrier component, etc.) of the cell for which SI is to be obtained, e.g.,
    obtaining SIB2 may be not necessary when inter-frequency cell reselection is expected but instead SIB5 may be obtained (this may be decided by the UE, e.g., based on intraFreqReselection comprised in SIB1 or this may decided by the network which may also act different for different purposes of obtaining SI),
    with method 2 a network node may selectively provide the SI information upon frequency information,
    a network node may selectively provide assistance data for methods of obtaining SI which are adaptively selected and/or combined,
    the set of methods of obtaining SI may depend on the frequency information some methods of obtaining SI (e.g., method 1) may be less preferred for lower frequencies than other methods (e.g., method 2 or 3).

CA configuration and serving cell activation status, e.g.,
  in CA, method 3 may be preferred or more often used since the standard may define certain synchronization requirements and time alignment for cells configured in CA.

Radio node's capability or node's type (e.g., some types of serving nodes may be not capable of supporting method 2).

Figure 8:
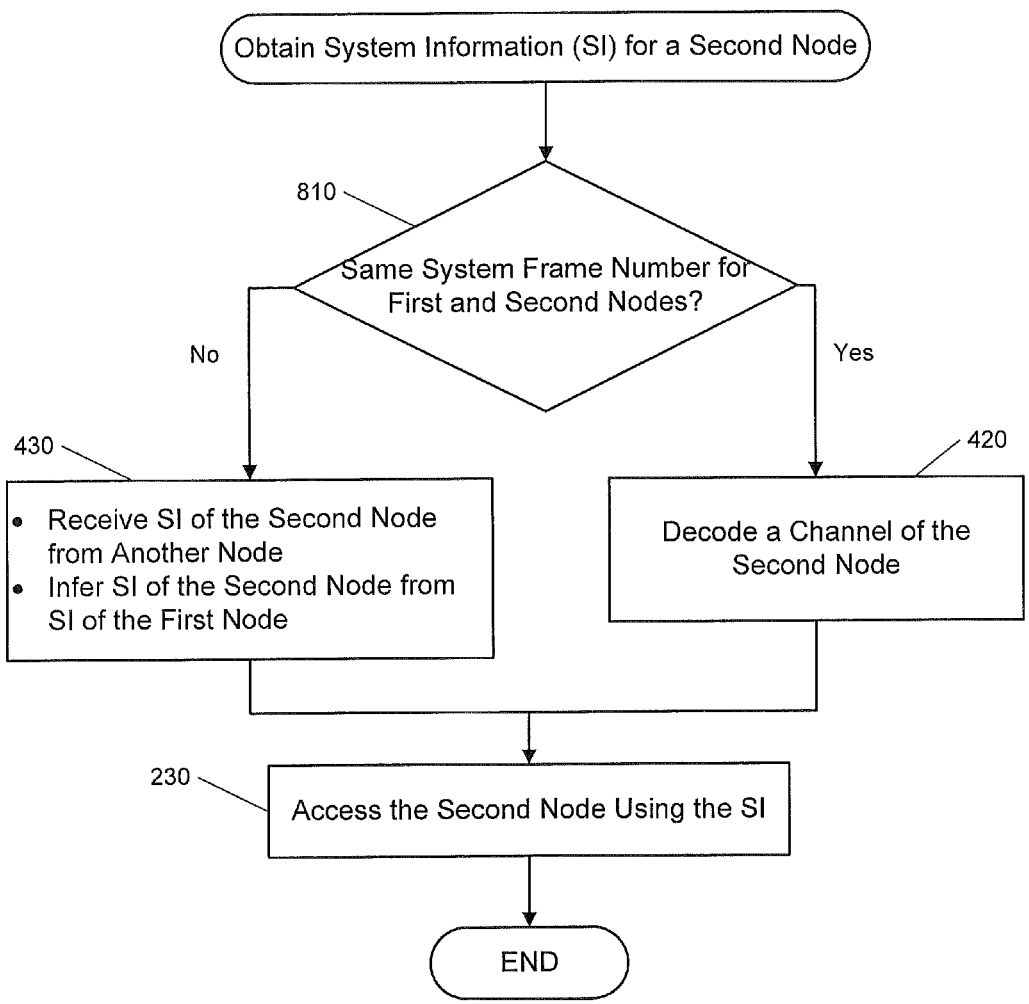

Network SFN synchronization level. The SFN synchronization means same SFN is used in at least part of the network, e.g., same SFN is used always (e.g., when cells are synchronized) or in at least part of the time (e.g., when radio frames are partially overlapping) in UE's serving cell, aggressor cell(s) and neighboring cells. In another example, it may refer to SFN synchronization between serving and target cell to which a cell change may occur.
  For example, as illustrated in FIG. 8, if the same SFN is used in serving and target cell for cell change at Block 810, then UE obtains SI of the target cell by using method 1 (Block 420), otherwise by using method 2 or 3 (Block 430). This is because there may be predefined UE performance requirements for decoding SI (e.g., PBCH) applicable under the condition that SFN is synchronized (e.g., same SFN in at least part of the time) is used in the UE's serving cell and the target cell (also known as neighboring cell or measured cell or candidate cell for cell change, etc.). Therefore if the SFN is not the same on the said serving and target cells then UE acquires SFN of the target cell using method 2 or 3. To facilitate this mechanism the serving node of the UE also determines whether the SFN is the same or not in the serving and the target cells of the UE. If the SFN is different than the serving node acquires the SFN of the said target cell (e.g., via X2 interface between eNBs in LTE) and sends it to the UE when doing cell change of the UE. For example it can be signaled in cell change command (also known as HO command). The SFN may be sent as part of the SI in a HO command. The network node may also send an explicit indicator indicating the UE whether the same SFN is used in the serving and neighboring cells or not. For example if the indicator indicates that the same SFN is used then the UE may avoid even obtaining SFN (an hereby save power, time, reduce the error probability since decoding a neighbor cell may be subject to a higher error due to a weaker signal) especially if signal quality of target cell is below a threshold (e.g., SNR<−0 dB). The UE will then assume the same SFN in target cell as used in its serving cell and use it for accessing the said target cell.

Figure 9:
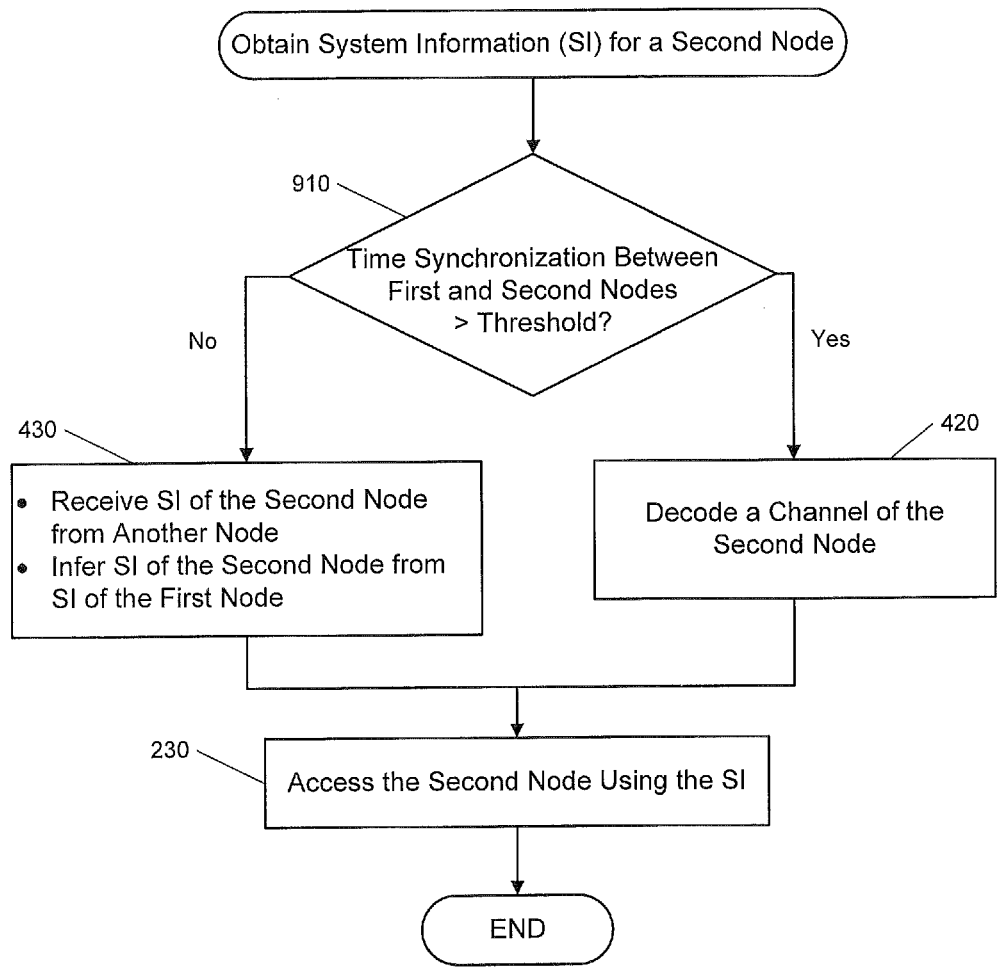

Network time synchronization level, e.g., in at least part of the network. The time synchronization refers to the time synchronization between the signals transmitted by a pair of radio nodes (which are time-synchronized) in the network. It is also known as the cell phase synchronization accuracy. It is defined as the maximum absolute deviation in frame start timing between any pair of cells on the same frequency that have overlapping coverage areas. The time synchronization accuracy between any two radio nodes in a network can be in the order of 1-10 μs.
  For example, as illustrated in FIG. 9, if time synchronization between serving and target cells is better than a threshold (Block 910) then UE obtains SI of the target cell by using method 1 (Block 420), otherwise by using method 2 or 3 (Block 430).

Received Time synchronization: The synchronization may also be the observed time difference of the signals from the two radio nodes received at a UE. This is also known as the received time difference of signals received from the radio nodes at the UE. The received time difference at the UE may depend upon several factors namely: the UE location with respect to the radio nodes, the inter-site distance between radio nodes, size of cells, time alignment or phase synchronization accuracy between radio nodes, etc. The magnitude of the received time difference can be as large as 10-30 µs.

Figure 10:
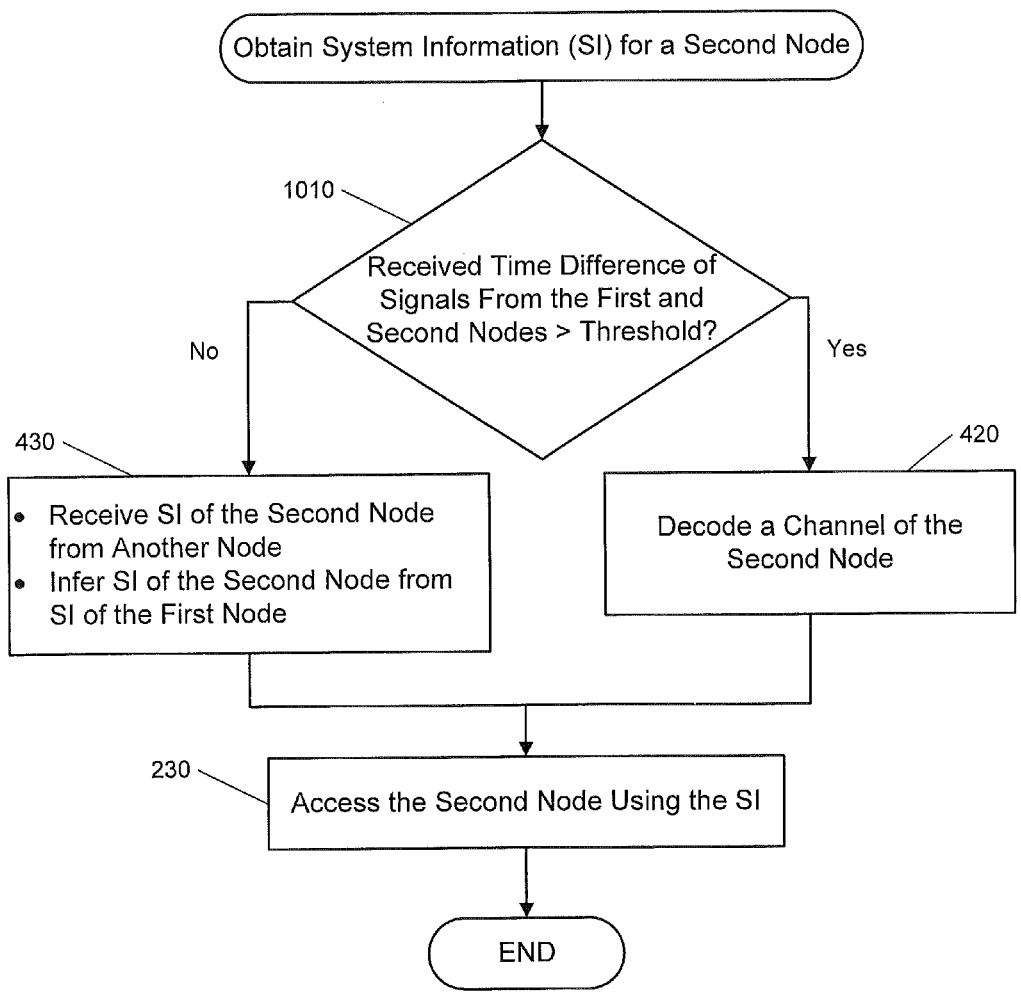

For example, as illustrated in FIG. 10, if received time synchronization between serving and target cells is better (smaller synchronization error) than a threshold (Block 1010) then UE obtains SI of the target cell by using method 1 (Block 420), otherwise by using method 2 or 3 (Block 430).

Frequency Synchronization: The frequency synchronization can be expressed in terms of relative frequency error or relative frequency accuracy between any two radio nodes.

Figure 11:
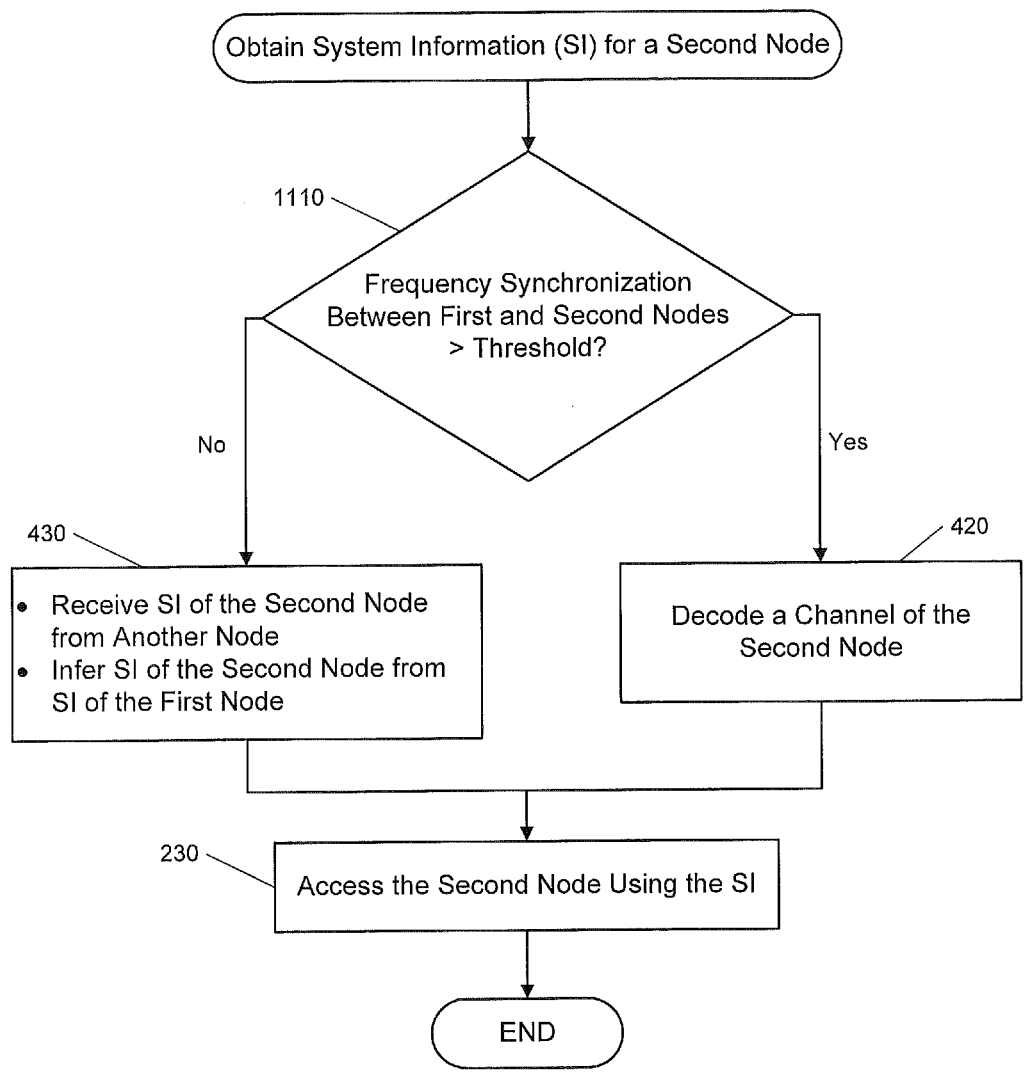

For example, as illustrated in FIG. 11, if frequency synchronization between serving and target cells is better (smaller synchronization error) than a threshold (Block 1110) then UE obtains SI of the target cell by using method 1 (Block 420) otherwise by using method 2 or 3 (Block 430).

According to some embodiments, any of the above the information about synchronization (for a respective synchronization type) may be obtained in different ways, e.g., by one or more of:

"learned" by the UE during the operating and receiving radio signals (e.g., performing cell detection), Determined by a pre-defined rule (e.g., a certain synchronization of a certain type may be implied when a time-domain inter-cell interference coordination is used), comprised in an indication (e.g., Boolean indicator for cell 1 and cell 2 or synchronization area indication) or data (e.g., SFN initialization time) received from another node (e.g., network node), determined based on a pre-defined rule (e.g., a requirement), based on an applicability rule for a certain category of cells (e.g., synchronization of a certain type may apply for cells whose PCIs are provided in a cell list, e.g., a mobility cell list of a certain type or a list of interfering cells comprised in assistance data for handling CRS interference), may be assumed based on pre-defined rule (e.g., associated with the RAT, node's type or deployment scenario type since the standard may define different synchronization requirements for different nodes' types (e.g., macro and femto) or deployments (e.g., depending on inter-site distance or cell size) or RAT (e.g., FDD or TDD)), by association with a physical or a logical area, where a logical area may be described by an area identifier and the area may be smaller than a cell, may be larger than a cell, may comprise at least parts of at least two cells, etc. Some examples of an area are tracking area, local area, MBSFN area, a time-synchronization area, an SFN synchronization area.

3.1.1.5 Systems/Methods In Wireless Device For Using The Obtained SI For Radio Operational Tasks As was illustrated in Block 230 of FIGS. 2-12, the wireless device after acquiring the SI of a cell uses the acquired SI for one or more radio operational tasks. Examples of radio operational tasks are determining a radio frame number (e.g., SFN) of the said cell, accessing a cell by sending an uplink transmission during a specific radio frame number (e.g., one of the pre-defined SFN), performing a random access to the said cell in a radio frame where random access is used (e.g., radio frame with even SFN), sending an uplink transmission at a specific time or radio frame to facilitate positioning measurement by said cell, handle the inter-cell interference from one or more signals or channels (e.g., CRS interference) and configuring its receiver accordingly, configuring a bandwidth for measurements, configuring one or more channels (e.g., PHICH, PCFICH, PDCCH, or a shared channel for obtaining further SI such as SIB1, SIB2, SIB5 or SIB8, etc.), configuring and/or performing a measurement and/or receive a channel.

3.1.2 Systems/Methods In A Network Node To Enable A Hybrid Approach Of Obtaining Si By A Wireless Device According to these embodiments, a first network node implements methods for support and enhancing of adaptive selection (e.g., adaptive selection of a method from a set of supported methods) and/or combining (e.g., method 1 and method 2) or any hybrid of the two, according to any of the embodiments described herein. For example, any one or any combination of embodiments described in Section 3.1.1 applies also here, e.g., the device implements embodiments described in Section 3.1.1. The capabilities described herein may also be based on the embodiments described in Section 3.1.3.

The methods for support and enhancing of adaptive selection and/or combining or any hybrid of the two may further comprise, e.g., Managing and/or exchange of capability information, e.g.,
Providing the network node's capability associated with adaptive selection and/or combining of methods for obtaining SI to another radio network node, network node in general or to a wireless device.

Receiving a capability associated with adaptive selection and/or combining of methods for obtaining SI from another node, e.g., from a radio network node, network node in general or from a wireless device.

Providing and/or receiving capability information associated with a receiver capability relate to any one or more of: method 1, 2, or 3 to/from another node.

Managing (e.g., creating, collecting, storing, processing, using) and/or exchange of information/data (e.g., assistance data) associated with any one or more of methods 1, 2, and 3. Some examples of the assistance data comprise assistance information for the receiver to facilitate interference handling, measurements, channel receptions, or obtaining SI; information related to any synchronization type (e.g., as described in Section 3.1.1) or any one or more of SI components (e.g., MIB, SIB1, SIB2, SIB5, SIB8, or any data comprised in any one or more of MIB and SIB1-13).

Signaling for controlling (e.g., triggering, requests for a certain action or information, reports, response on the requests, indication signaling, assistance data, signaling comprising a condition or a threshold for selection and/or combining methods for obtaining SI, etc.) the adaptive selection and/or combining of methods for obtaining SI or their hybrid, the signaling involving the network node, e.g., signaling from the network node, to the network node, or via the network node. The controlling decision may or may not be made in the network node.

Any of the methods involving the network node described in other sections herein.

Methods for interference coordination (e.g., by means of scheduling, interference information exchange with other nodes, signal muting, power control, cell range control or handover bias control, etc.) in the network node to control interference conditions and hereby to control and/or facilitate using any one or more of methods 1-3 or adaptive method selection, method combining or their hybrid.

Methods of receiving/collecting SI of neighbor nodes (e.g., from neighbor node or from other nodes such as via UE or from O&M) and using this information to control or facilitate any one or more of methods 1-3 or adaptive method selection, method combining or their hybrid for at least one UE.

According to other embodiments, several components of the SI do not differ between the first and the second nodes. The device determines whether it is able to receive SI information from the second node by means of an advanced receiver or otherwise. It also determines whether information can or will be provided by the second node. If neither of these two are the case, then the device assumes that components of the SI that have not been obtained are the same in the second node as in the first node.

3.1.3 Capability Associated With Adaptive Selection And/Or Combining Of Methods For Obtaining SI The capability associated with adaptive selection and/or combining of methods for obtaining SI may comprise Capability of individual nodes (e.g., radio network node, network node, wireless device, etc.) to support any of the individual methods 1, 2, or 3 for obtaining SI.
See, e.g., section 3.1.3.1 for methods to support and use such capability in a wireless device; at least some of similar methods may be supported by a network node Capability of individual nodes (e.g., radio network node, network node, wireless device, etc.) to support the adaptive selection among at least any two methods for obtaining SI.

Capability of individual nodes (e.g., radio network node, network node, wireless device, etc.) to support combining of at least two methods for obtaining SI.

Capability of individual nodes (e.g., radio network node, network node, wireless device, etc.) to support a hybrid of selection and combining for at least two methods for obtaining SI.

Any of the above capabilities may be further associated with some conditions, e.g., interference level condition, BS class or wireless device class, etc.

3.1.3.1 Systems/Methods In Wireless Device of Signaling Capability Related To Obtaining SI All wireless devices may not be capable of acquiring the SI of a cell, e.g., a neighboring cell. For example the pre-defined requirements to ensure UE can receive SI of a cell may be optional. In another example the pre-defined requirements may be pre-defined down to certain signal quality level of a cell whose SI can be obtained by the UE. Therefore it is beneficial for the network to know whether a UE can obtain the SI of a cell or if it can obtain it down to what signal level.

3.1.3.2 Wireless Device Capability Information

Figure 12:
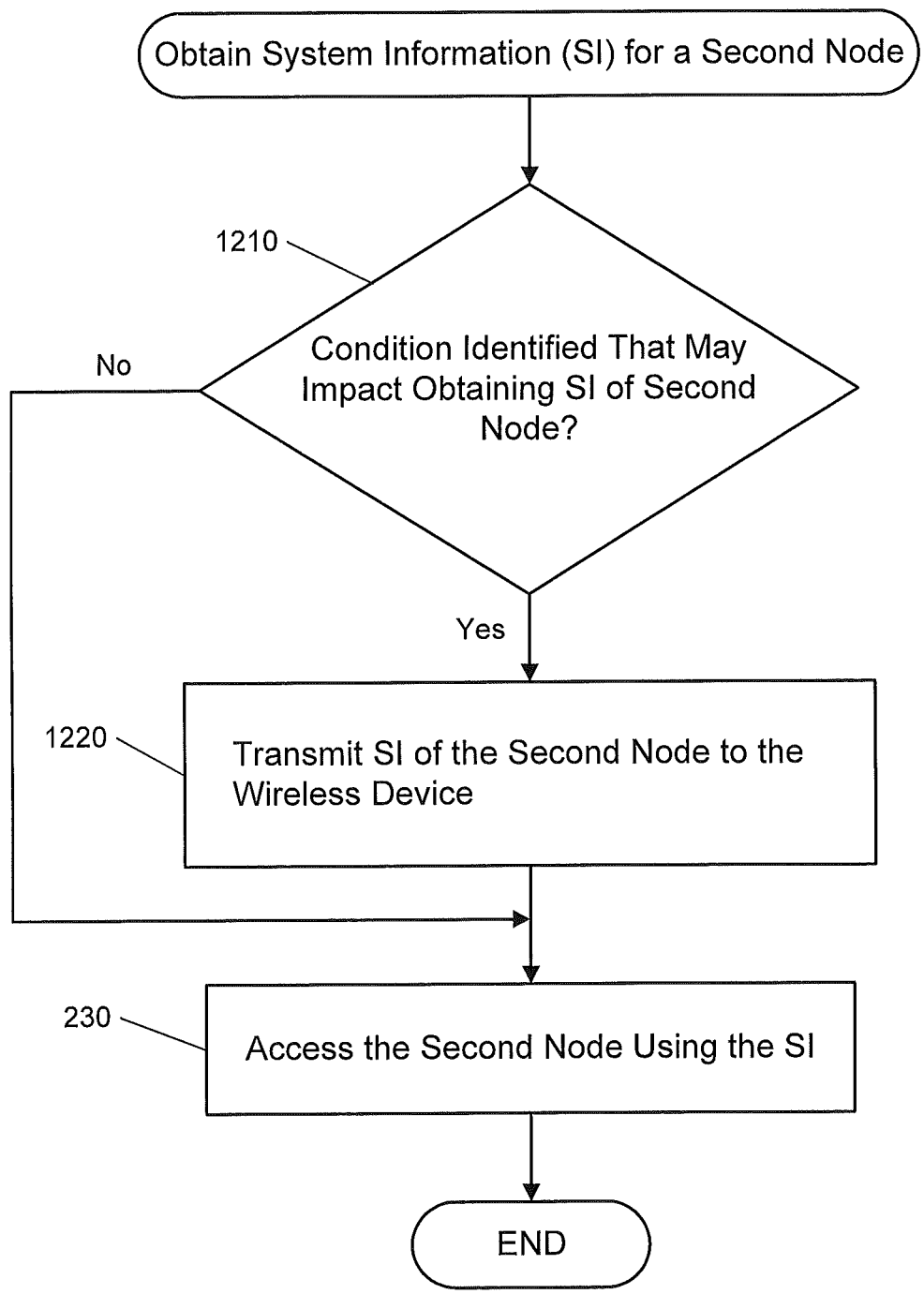

Referring to FIG. 12, according to these embodiments, a wireless device (e.g., UE, target device, etc.) reports its capability to a network node (e.g., serving radio node, core network node, positioning node, MDT node, SON node, etc.) indicating that it is capable of acquiring a SI of a cell by using a hybrid method which comprises adaptive selection of method 1 and method 2 and method 3 (Block 1210). The capability information may also indicate that the wireless device is capable of acquiring a specific part or type of SI of a cell, e.g., only MIB, only SIB1, MIB and SIB1, SIB2 and/or SIB5, SIB8, etc. The capability information may also indicate that the wireless device is capable of acquiring the SI of a cell by using a specific receiver mechanism within method 1 and/or within method 2.

The capability may also contain additional information. For example the wireless device may indicate that it is capable of acquiring system information or part of it or specific component of SI:

Provided it does not have to receive or decode any other channel from a cell in parallel with acquiring the SI of that cell or of any other cell.

Provided it does not have to receive or decode more than certain number of channels (e.g., 2 channels) from a cell in parallel with acquiring the SI of that cell or of any other cell.

3.1.3.3 Capability Reporting Mechanism

The wireless device may send its capability information to the network node in any of the following manner:

Proactive reporting without receiving any explicit request from the network node (e.g., positioning node, serving or any target network node).

Reporting upon receiving any explicit request from the network node (e.g., positioning node, serving or any target network node).

The explicit request can be sent to the UE by the network anytime or at any specific occasion. For example the request for the capability reporting can be sent to the UE during initial setup or after a cell change (e.g., handover, RRC connection re-establishment, RRC connection release with redirection, PCell change in CA, PCC change in PCC, etc.), when positioning session or measurement is started, etc.

In case of proactive reporting, the UE may report its capability during one or more of the following occasions:

During initial setup or call setup, e.g., when establishing the RRC connection.

During cell change, e.g., handover, primary carrier change in multi-carrier operation, PCell change in multi-carrier operation, RRC re-establishment, RRC connection release with redirection, etc.

3.1.3.4 Systems/Methods In A Network Node Of Using Received Capability Information Still referring to FIG. 12, the network node receiving the capability information may use this for one or more radio management tasks involving SI acquisition of a cell. These tasks are described with examples (more examples are even in Sections 3.1.1-3.1.2). In one example the network node may use the wireless device capability to determine whether to directly send the SI of a target cell of the wireless device to the wireless device or not (Block 1220). In another example the network node may decide whether to send a schedule the wireless device or not, e.g., depending upon parallel number of channels the wireless device can receive according to its capability. In another example the positioning node may decide based on capability of a wireless device whether it should request the wireless device to performing a positioning measurement on certain cell or not.

3.1.4 Pre-Defined Rules And Applicability To Requirements And Testing

Embodiments described in other sections may also apply herein or may be combined with any embodiment described in this section.

3.1.4.1 Compliance To Pre-Defined Requirements

In these embodiments, the UE has to meet the pre-defined requirements for obtaining SI method using hybrid method. It may be pre-defined that the UE shall meet the pre-defined requirements depending upon the condition(s) associated with the acquiring SI of the target cell when hybrid method is used.

For example it has to acquire the SI within certain time period depending upon whether method 1 is used or method 2 is used or method 1 and method 2 or method 3 are used for obtaining the SI of the target cell. It may also be pre-defined that the time period during which the SI is obtained depends upon the receiver mechanism used within a method when hybrid method is used.

There may also be a requirement on the network node (supporting such capability) to provide SI or at least one of its component in pre-defined conditions. The network node may not provide this information if at least one of the conditions is not met.

3.1.4.2 Compliance To Tests

Various embodiments described herein, including any of the techniques described in any of the preceding sections, may also be implemented in the test equipment (TE) node (also known as system simulator (SS) or test system (TS)). The TE or SS will have to implement all configuration methods related to embodiments applicable to different nodes, e.g., wireless device and serving radio network node, aggressor radio node, in order to verify pre-defined requirements and procedures described in preceding sections.

The purpose of the test is to verify that the nodes are compliant to the pre-defined rules, protocols, signaling and requirements associated with the compensation applied to the timing measurements.

Typically the TE or SS or TS separately performs tests for UE and radio network nodes.

The testing may be measurement-specific and may be capability-dependent. For example, requirements described in preceding section may be verified with such TE or SS.

For UE testing, the TE or SS will also be capable of:
  receiving a report with the obtained SI or based on the obtained SI from a measuring node,
  Analyzing the received results, e.g., comparing the measurement result or the statistics of the measurement results (e.g., with 90% confidence) obtained in the test with the reference results to determine whether wireless device is compliant to the requirements or not. The reference can be based on the pre-defined requirements or UE behavior or theoretical estimate or performed by a reference device. The reference device can be part of TE or SS.

4 Example Implementations

Figure 1B:
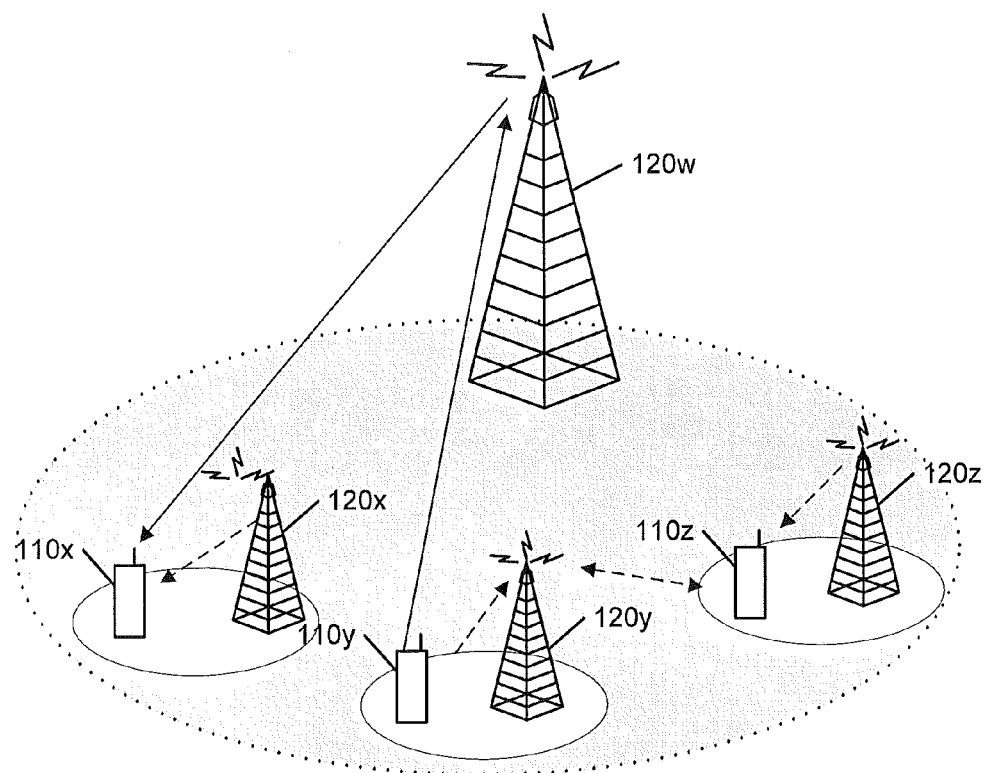
Figure 1C:
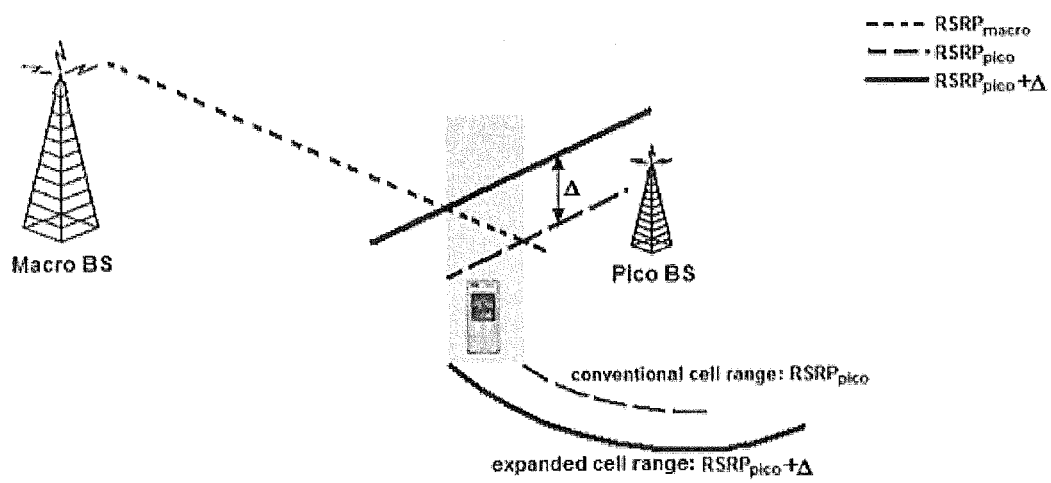

Although various embodiments described herein may be implemented in any appropriate type of telecommunication system supporting any suitable communication standards and using any suitable components, particular embodiments of the described solutions may be implemented in an LTE network, such as the example networks shown in FIGS. 1A-1C above. As shown by FIGS. 1A-1C, example networks may include one or more instances of user equipment (UEs) 110 and one or more macro base stations 120w capable of communicating with these UEs and one or more low-power nodes 120x, y, z also capable of communication with these UE, along with any additional elements suitable to support communication between UEs or between a UE and another communication device (such as a landline telephone). Although the illustrated UEs may represent communication devices that include any suitable combination of hardware and/or software, these UEs may, in particular embodiments, represent devices such as the example UE illustrated in greater detail by FIG. 13. Similarly, although the illustrated base stations and low-power nodes may represent network nodes that include any suitable combination of hardware and/or software, these base stations and low-power nodes may, in particular embodiments, represent devices such as the example base station illustrated in greater detail by FIG. 14 and FIG. 15, respectively.

Figure 13:
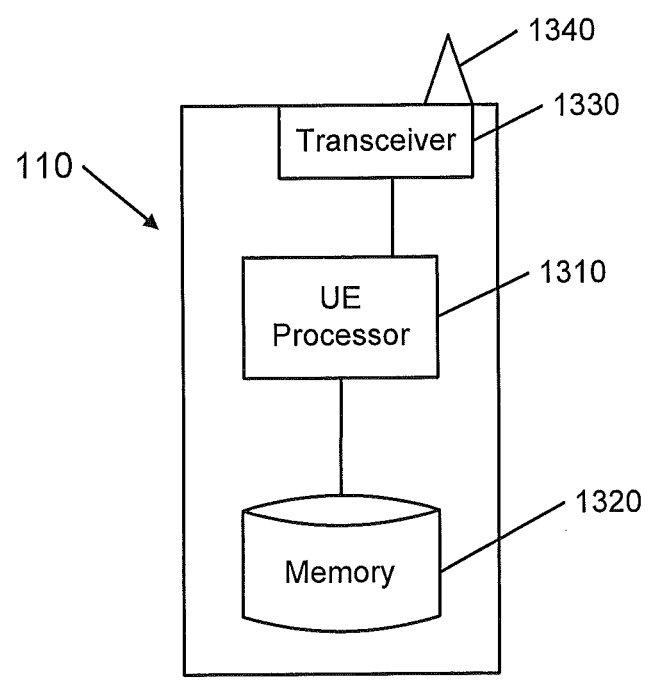
FIG. 13 is a block diagram of a wireless device that may be used with any embodiments described herein.

As shown in FIG. 13, the example UE includes a processor 1310, a memory 1320, a transceiver 1330, and an antenna 1340. In particular embodiments, some or all of the functionality described above as being provided by mobile communication devices or other forms of UE may be provided by the UE processor 1310 executing instructions stored on a computer-readable medium, such as the memory 1320 shown in FIG. 13. Alternative embodiments of the UE may include additional components beyond those shown in FIG. 13 that may be responsible for providing certain aspects of the UE's functionality, including any of the functionality described above and/or any functionality necessary to support the various embodiments described above.

Figure 14:
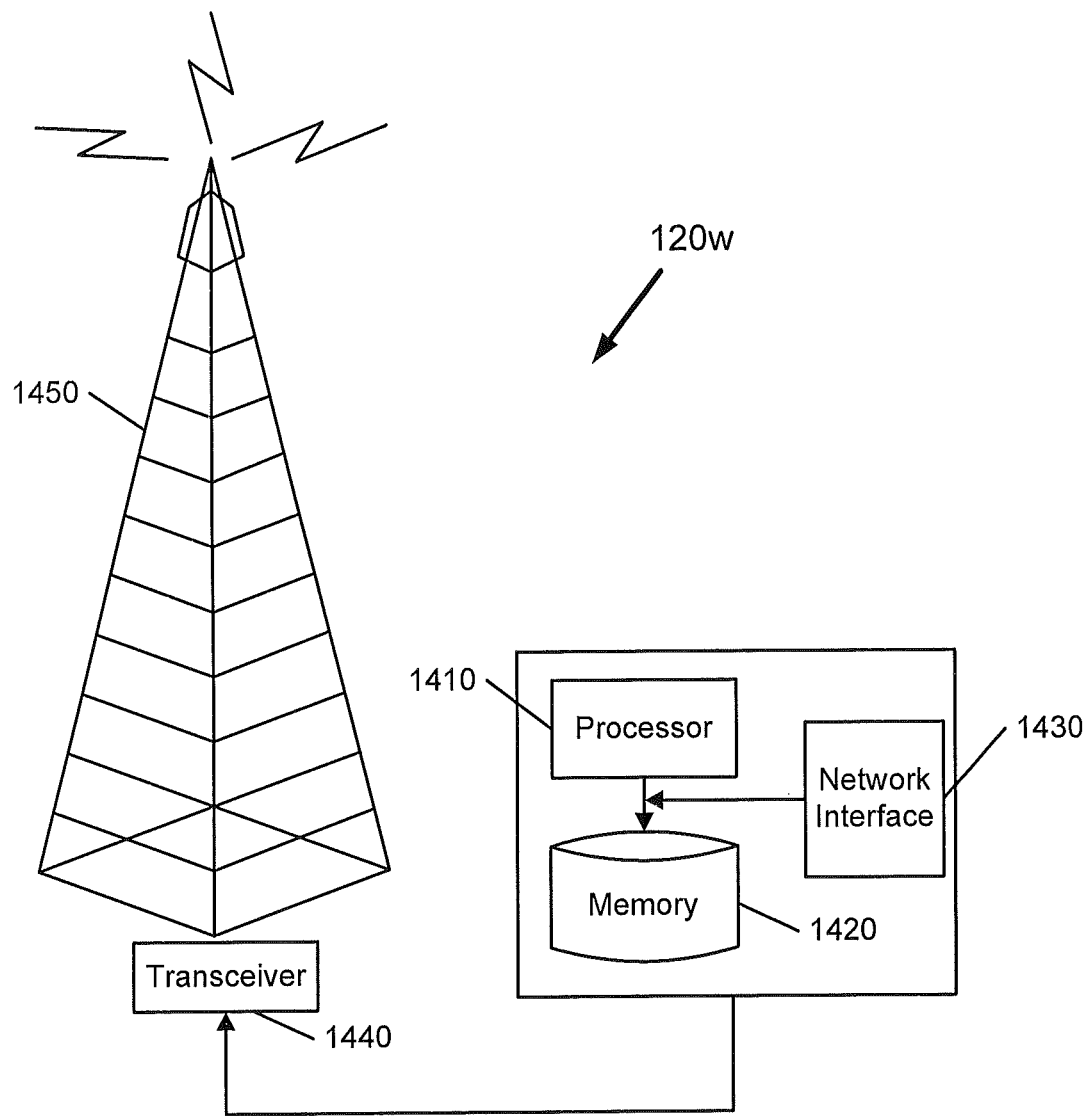
FIGS. 14 and 15 are block diagrams of nodes that may be used with any of the embodiments described herein.

As shown in FIG. 14, the example base station 120w includes a processor 1410, a memory 1420, a network interface 1430, a transceiver 1440, and an antenna 1450. In particular embodiments, some or all of the functionality described above as being provided by a mobile base station, a base station controller, a node B, an enhanced node B, and/or any other type of mobile communications node may be provided by the base station processor 1410 executing instructions stored on a computer-readable medium, such as the memory 1420 shown in FIG. 14. Alternative embodiments of the base station may include additional components responsible for providing additional functionality, including any of the functionality identified above and/or any functionality necessary to support the solution described above.

Figure 15:
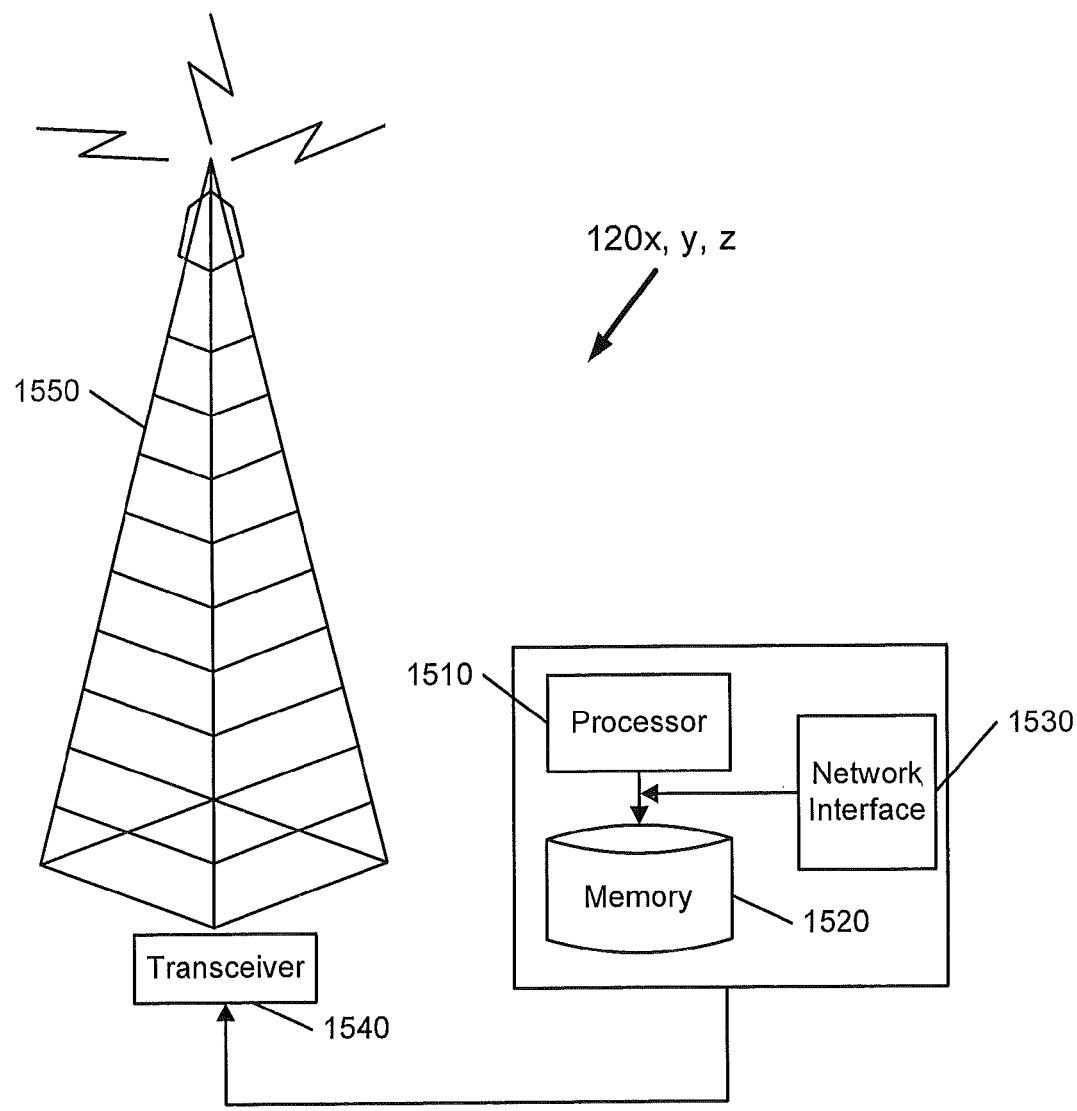

As shown in FIG. 15, the example low-power node 120x, y, z includes a processor 1510, a memory 1520, a network interface 1530, a transceiver 1540, and an antenna 1550. In particular embodiments, some or all of the functionality described above as being provided by a low-power node, a pico base station, femto base station, micro base station, home eNodeB, relay, remote radio head, access point, and/or any other type of mobile communications node may be provided by the node processor 1510 executing instructions stored on a computer-readable medium, such as the memory 1520 shown in FIG. 15. Alternative embodiments of the low-power node may include additional components responsible for providing additional functionality, including any of the functionality identified above and/or any functionality necessary to support the solution described above.

5 Potential Advantages Of The Various Embodiments Described Herein

Some of the potential advantages that can be envisioned with various embodiments described herein are as follows:
  The SI of a target can be reliably obtained by the UE even when signal quality of target cell is low.
  The handover failure rate is reduced.
  The radio interface signaling overheads are reduced since network does not have to signal the SI of target cells to the UE all the time.

The signaling overheads on network interfaces are reduced since network does not have to acquire the SI of the neighboring cells all the time.

Power consumption of wireless device and radio network nodes is reduced due to the more efficient methods of obtaining SI and dynamic selection/combing the methods of obtaining SI.

6 Abbreviations

3GPP 3rd Generation Partnership Project
BS Base Station
CRS Cell-specific Reference Signal
eNodeB evolved Node B
E-SMLC Evolved SMLC
FDD Frequency Division Duplex
LTE Long-Term Evolution
LMU Location Measurement Unit
MDT Minimization of Drive Tests
MME Mobility Management Entity
OTDOA Observed Time Difference of Arrival
PCI Physical Cell Identity
PLMN Public Land Mobile Network
PRS Positioning Reference Signals
RF Radio Frequency
RRC Radio Resource Control
RSRP Reference Signal Received Power
RSRQ Reference Signal Received Quality
RSSI Received Signal Strength Indicator
RTOA Relative Time of Arrival
SINR Signal-to-Interference Ratio
SLP SUPL Location Platform
SON Self-Optimized Network
SRS Sounding Reference Signals
SUPL Secure User Plane Location
TDD Time Division Duplex
UE User Equipment
ULP User-plane Location Protocol
UMTS Universal Mobile Telecommunications System
UTDOA UL Time Difference of Arrival Various embodiments were described herein with reference to the accompanying drawings, in which embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art.

It will be understood that, when an element is referred to as being "connected", "coupled", "responsive", or variants thereof to another element, it can be directly connected, coupled, or responsive to the other element or intervening elements may be present. In contrast, when an element is referred to as being "directly connected", "directly coupled", "directly responsive", or variants thereof to another element, there are no intervening elements present. Furthermore, "coupled", "connected", "responsive", or variants thereof as used herein may include wirelessly coupled, connected, or responsive. Like numbers refer to like elements throughout. The terminology used herein is for the purpose of describing particular embodiments only and is not intended to be limiting of the invention. As used herein, the singular forms "a", "an" and "the" are intended to include the plural forms as well, unless the context clearly indicates otherwise. Well-known functions or constructions may not be described in detail for brevity and/or clarity.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of the present invention. Moreover, as used herein, the term "and/or" includes any and all combinations of one or more of the associated listed items.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of this specification and the relevant art and will not be interpreted in an idealized or overly formal sense expressly so defined herein.

Various embodiments described herein can operate in any of the following Radio Access Technologies: Advanced Mobile Phone Service (AMPS), ANSI-136, Global Standard for Mobile (GSM) communication, General Packet Radio Service (GPRS), enhanced data rates for GSM evolution (EDGE), DCS, PDC, PCS, code division multiple access (CDMA), wideband-CDMA, CDMA2000, Universal Mobile Telecommunications System (UMTS), 3GPP LTE (3rd Generation Partnership Project Long Term Evolution) and/or 3GPP LTE-A (LTE Advanced). For example, GSM operation can include reception/transmission in frequency ranges of about 824 MHz to about 849 MHz and about 869 MHz to about 894 MHz. EGSM operation can include reception/transmission in frequency ranges of about 880 MHz to about 914 MHz and about 925 MHz to about 960 MHz. DCS operation can include transmission/reception in frequency ranges of about 1410 MHz to about 1785 MHz and about 1805 MHz to about 1880 MHz. PDC operation can include transmission in frequency ranges of about 893 MHz to about 953 MHz and about 810 MHz to about 885 MHz. PCS operation can include transmission/reception in frequency ranges of about 1850 MHz to about 1910 MHz and about 1930 MHz to about 1990 MHz. 3GPP LTE operation can include transmission/reception in frequency ranges of about 1920 MHz to about 1980 MHz and about 2110 MHz to about 2170 MHz. Other Radio Access Technologies and/or frequency bands can also be used in various embodiments described herein. All these systems are designed to operate in a variety of bands typically known as the International Mobile Telecommunications (IMT) bands that are defined by the International Telecommunications Union-Radio Communication Bureau (ITU-R) and can, in general, be located in frequency ranges between 200 MHz and 5 GHZ within the current state of the art. It should, however, be noted that various embodiments described herein are equally applicable for any radio system, and are not restricted in any way to the IMT bands in any way.

For purposes of illustration and explanation only, various embodiments of the present invention were described herein in the context of wireless devices that are configured to carry out cellular communications (e.g., cellular voice and/or data communications). It will be understood, however, that the present invention is not limited to such embodiments and may be embodied generally in any wireless communication terminal that is configured to transmit and receive according to one or more radio access technologies.

As used herein, the term "wireless device" includes cellular and/or satellite radiotelephone(s) with or without a display (text/graphical); Personal Communications System (PCS) terminal(s) that may combine a radiotelephone with data processing, facsimile and/or data communications capabilities; Personal Digital Assistant(s) (PDA) or smart phone(s)

that can include a radio frequency transceiver and a pager, Internet/Intranet access, Web browser, organizer, calendar and/or a global positioning system (GPS) receiver; and/or conventional laptop (notebook) and/or palmtop (netbook) computer(s) or other appliance(s), which include a radio frequency transceiver. As used herein, the term "wireless device" also includes any other radiating user device that may have time-varying or fixed geographic coordinates and/or may be portable, transportable, installed in a vehicle (aeronautical, maritime, or land-based) and/or situated and/or configured to operate locally and/or in a distributed fashion over one or more terrestrial and/or extra-terrestrial location(s). Finally, the term "node" includes any fixed, portable and/or transportable device that is configured to communicate with one or more user equipment and a core network, and includes, for example, terrestrial cellular base stations (including microcell, picocell, wireless access point and/or ad hoc communications access points) and satellites, that may be located terrestrially and/or that have a trajectory above the earth at any altitude.

As used herein, the terms "comprise", "comprising", "comprises", "include", "including", "includes", "have", "has", "having", or variants thereof are open-ended, and include one or more stated features, integers, elements, steps, components or functions but does not preclude the presence or addition of one or more other features, integers, elements, steps, components, functions or groups thereof. Furthermore, if used herein, the common abbreviation "e.g.", which derives from the Latin phrase exempli gratia, may be used to introduce or specify a general example or examples of a previously mentioned item, and is not intended to be limiting of such item. If used herein, the common abbreviation "i.e.", which derives from the Latin phrase id est, may be used to specify a particular item from a more general recitation.

Exemplary embodiments were described herein with reference to block diagrams and/or flowchart illustrations of computer-implemented methods, apparatus (systems and/or devices) and/or computer program products. It is understood that a block of the block diagrams and/or flowchart illustrations, and combinations of blocks in the block diagrams and/or flowchart illustrations, can be implemented by computer program instructions that are performed by processor circuitry. These computer program instructions may be provided to processor circuitry of a general purpose computer circuit, special purpose computer circuit such as a digital processor, and/or other programmable data processor circuit to produce a machine, such that the instructions, which execute via the processor circuitry of the computer and/or other programmable data processing apparatus, transform and control transistors, values stored in memory locations, and other hardware components within such circuitry to implement the functions/acts specified in the block diagrams and/or flowchart block or blocks, and thereby create means (functionality) and/or structure for implementing the functions/acts specified in the block diagrams and/or flowchart block(s). These computer program instructions may also be stored in a computer-readable medium that can direct a computer or other programmable data processing apparatus to function in a particular manner, such that the instructions stored in the computer-readable medium produce an article of manufacture including instructions which implement the functions/acts specified in the block diagrams and/or flowchart block or blocks.

A tangible, non-transitory computer-readable medium may include an electronic, magnetic, optical, electromagnetic, or semiconductor data storage system, apparatus, or device. More specific examples of the computer-readable medium would include the following: a portable computer diskette, a random access memory (RAM) circuit, a read-only memory (ROM) circuit, an erasable programmable read-only memory (EPROM or Flash memory) circuit, a portable compact disc read-only memory (CD-ROM), and a portable digital video disc read-only memory (DVD/BlueRay).

The computer program instructions may also be loaded onto a computer and/or other programmable data processing apparatus to cause a series of operational steps to be performed on the computer and/or other programmable apparatus to produce a computer-implemented process such that the instructions which execute on the computer or other programmable apparatus provide steps for implementing the functions/acts specified in the block diagrams and/or flowchart block or blocks.

Accordingly, embodiments of the present invention may be embodied in hardware and/or in software (including firmware, resident software, micro-code, etc.) that runs on a processor such as a digital signal processor, which may collectively be referred to as "processor circuitry," "a module" or variants thereof.

It should also be noted that in some alternate implementations, the functions/acts noted in the blocks may occur out of the order noted in the flowcharts. For example, two blocks shown in succession may in fact be executed substantially concurrently or the blocks may sometimes be executed in the reverse order, depending upon the functionality/acts involved. Moreover, the functionality of a given block of the flowcharts and/or block diagrams may be separated into multiple blocks and/or the functionality of two or more blocks of the flowcharts and/or block diagrams may be at least partially integrated. Finally, other blocks may be added/inserted between the blocks that are illustrated. Moreover, although some of the diagrams include arrows on communication paths to show a primary direction of communication, it is to be understood that communication may occur in the opposite direction to the depicted arrows.

Many different embodiments were disclosed herein, in connection with the following description and the drawings. It will be understood that it would be unduly repetitious and obfuscating to literally describe and illustrate every combination and subcombination of these embodiments. Accordingly, the present specification, including the drawings, shall be construed to constitute a complete written description of all combinations and subcombinations of the embodiments described herein, and of the manner and process of making and using them, and shall support claims to any such combination or subcombination.

In the drawings and specification, there have been disclosed embodiments of the invention and, although specific terms are employed, they are used in a generic and descriptive sense only and not for purposes of limitation, the scope of the invention being set forth in the following claims.

What is claimed is:

1. A method of obtaining System Information (SI) of a second base station of a wireless network for a wireless device that is communicating with a first base station of the wireless network, the method comprising:
   in response to at least one criterion, selectively performing at least two operations comprising:
   decoding at least one channel of the second base station to obtain the SI of the second base station;
   receiving the SI of the second base station from a base station other than the second base station; and/or
   inferring at least one component of the SI of the second base station based on a corresponding at least one component of the SI of the first base station, wherein the SI of the second base station comprises one or more components of a SystemInformationBlock (SIB) of the second base station.

2. A method according to claim 1 wherein the at least one criterion comprises:
- a predefined rule for selectively performing the at least two of the operations;
- a wireless communications signal measurement-based criterion for selectively performing the at least two of the operations; and/or
- a recommendation from a wireless network element other than the wireless device for selectively performing the at least two of the operations.

3. A method according to claim 2 wherein the predetermined rule comprises performing the receiving if the decoding fails and performing the inferring if the receiving is not performed within a given time.

4. A method according to claim 2 wherein the wireless communications signal measurement-based criterion comprises an absolute and/or relative quality measure of a signal from the second base station and wherein the selectively performing comprises:
- performing the decoding if the absolute and/or relative quality measure of a signal from the second base station exceeds a threshold; and
- performing the receiving or the inferring if the absolute and/or relative quality measure of the signal from the second base station is less than the threshold.

5. A method according to claim 2 wherein the wireless communications signal measurement-based criterion comprises an absolute and/or relative quality measure of a signal from a base station other than the first and second base stations and wherein the selectively performing comprises:
- performing the decoding if an absolute and/or relative quality measure of a signal from a base station other than the first and second base stations is less than a threshold; and
- performing the receiving or the inferring lithe absolute and/or relative quality measure of the signal from the base station other than the first and second base stations exceeds the threshold.

6. A method according to claim 2 wherein the wireless communications signal measurement-based criterion comprises a difference between an absolute and/or relative quality measure of a signal from the second base station and from a base station other than the first and second base stations and wherein the selectively performing comprises:
- performing the decoding if the difference between the absolute and/or relative quality measure of a signal from the second base station and from the base station other than the first and second base stations is less than a threshold; and
- performing the receiving or the inferring if the difference between the absolute and/for relative quality measure of the signal from second base station and from the base station other than the first and second base stations exceeds the threshold.

7. A method according to claim 1 wherein the at least one criterion comprises a battery level of the wireless device and wherein the selectively performing comprises:
- performing the decoding if the battery level of the wireless device exceeds a threshold; and
- performing the receiving or the inferring if the battery level of the wireless device is less than the threshold.

8. A method according to claim 1 wherein the at least one criterion comprises power consumption of the wireless device and wherein the selectively performing comprises:
- performing a selected one of the decoding, receiving and inferring that consumes least power at the wireless device.

9. A method according to claim 1 wherein the at least one criterion comprises a class of wireless devices to which the wireless device belongs and wherein the selectively performing comprises:
- performing a selected one of the decoding, receiving and inferring based upon the class of wireless devices to which the wireless device belongs.

10. A method according to claim 1 wherein the at least one criterion comprises an absolute or relative location of the wireless device and wherein the selectively performing comprises:
- performing a selected one of the decoding, receiving and inferring based upon the absolute or relative location of the wireless device.

11. A method according to claim 1 wherein the at least one criterion comprises carrier frequency differences between the first and second base stations, bandwidth, number of strong interferers, carrier aggregation configuration of the wireless device and/or capability of the wireless device to obtain the SI.

12. A method according to claim 1 wherein the at least one criterion comprises System Frame Number (SFN) synchronization differences between the first and second base stations and wherein the selectively performing comprises:
- performing the decoding if the SFN of the first and second base stations is the same; and
- performing the receiving or the inferring if the SFN of the first and second base stations is different.

13. A method according to claim 1 wherein the at least one criterion comprises an accuracy of time synchronization of signals transmitted by the first and second base stations, received time difference of signals at the wireless device front the first and second base stations and/or an accuracy of frequency synchronization of signals transmitted by the first and second base stations.

14. A method according to claim 13 wherein the selectively performing comprises:
- performing the decoding if the accuracy of the transmit time synchronization and/or the received time difference at the wireless device is greater than their respective threshold and the accuracy of frequency synchronization is greater than a threshold; and
- performing the receiving or the inferring if the accuracy of the transmit time synchronization, the received time difference at the wireless device and/or the accuracy of frequency synchronization are less than their respective thresholds.

15. A method according to claim 1,
- wherein the selectively performing comprises performing the inferring, and
- wherein the inferring comprises setting at least one component of the SI of the second base station other than a System Frame Number (SFN) to be same as a corresponding at least one component of the SI of the first base station other than the SFN in response to the SFN of the first and second base stations being the same.

16. A method according to claim 1 further comprising:
- signaling a capability information to the first base station, the capability information indicating that the wireless device is capable of obtaining the SI of the second base station by selectively performing at least one of the decoding, the receiving and the inferring in response to at least one criterion.

17. A method according to claim 1 wherein the SI of the second base station comprises one or more components of a SystemInformationBlockType1(SIB-1) of the second base station.

18. A method according to claim 1 further comprising requesting, by the wireless device, the SI of the second base station from the base station other than the second base station.

19. A wireless device comprising:
a wireless transceiver that is configured to communicate with a first base station of a wireless network; and
a processor that is configured to obtain System Information (SI) of a second base station of the wireless network in response to at least one criterion to selectively perform operations comprising:
decoding at least one channel of the second base station that is received by the wireless transceiver to obtain the SI of the second base station;
receiving the SI of the second base station via the wireless transceiver from a base station other than the second base station; and/or
inferring at least one component of the SI of the second base station based on a corresponding at least one component of the SI of the first base station,
wherein the processor is configured to further selectively perform at least two of the operations in response to the at least one criterion, and
wherein the SI of the second base station comprises one or more components of a SystemInformationBlock (SIB) of the second base station.

20. A wireless device according to claim 19 wherein the at least one criterion comprises:
a predefined rule for selectively performing the at least two of the operations;
a wireless communications signal measurement-based criterion for selectively performing the at least two of the operations; and/or
a recommendation from a wireless network element other than the wireless device for selectively performing the at least two of the operations.

21. A wireless device according to claim 20 wherein the predetermined rule comprises performing the receiving if the decoding fails and performing the inferring if the receiving is not performed within a given time.

22. A wireless device according to claim 20 wherein the wireless communications signal measurement-based criterion comprises an absolute and/or relative quality measure of a signal from the second base station and wherein the processor is configured to further selectively perform operations comprising:
performing the decoding if the absolute and/or relative quality measure of a signal from the second base station exceeds a threshold; and
performing the receiving or the inferring if the absolute and/or relative quality measure of the signal from the second base station is less than the threshold.

23. A wireless device according to claim 20 wherein the wireless communications signal measurement-based criterion comprises an absolute and/or relative quality measure of a signal from a base station other than the first and second base stations and wherein the processor is configured to further selectively perform operations comprising:
performing the decoding if an absolute and/or relative quality measure of a signal from a base station other than the first and second base stations is less than a threshold; and
performing the receiving or the inferring if the absolute and/or relative quality measure of the signal from the base station other than the first and second base stations exceeds the threshold.

24. A wireless device according to claim 20 wherein the wireless communications signal measurement-based criterion comprises a difference between an absolute and/or relative quality measure of a signal from the second base station and from a base station other than the first and second base stations and wherein the processor is configured to further selectively perform operations comprising:
performing the decoding if the difference between the absolute and/or relative quality measure of a signal from the second base station and from the base station other than the first and second base stations is loss than a threshold; and
performing the receiving or the inferring if the difference between the absolute and/or relative quality measure of the signal from second base station and from the base station other than the first and second base stations exceeds the threshold.

25. A wireless device according to claim 19 wherein the at least one criterion comprises a battery level of the wireless device and wherein the processor is configured to further selectively perform operations comprising:
performing the decoding if the battery level of the wireless device exceeds a threshold; and
performing the receiving or the inferring if the battery level of the wireless device is less than the threshold.

26. A wireless device according to claim 19 wherein the at least one criterion comprises power consumption of the wireless device and wherein the processor is configured to further selectively perform operations comprising:
performing a selected one of the decoding, receiving and inferring that consumes least power at the wireless device.

27. A wireless device according to claim 19 wherein the at least one criterion comprises a class of wireless devices to which the wireless device belongs and wherein the processor is configured to further selectively perform operations comprising:
performing a selected one of the decoding, receiving and inferring based upon the class of wireless devices to which the wireless device belongs.

28. A wireless device according to claim 19 wherein the at least one criterion comprises an absolute or relative location of the wireless device and wherein the processor is configured to further selectively perform operations comprising:
performing a selected one of the decoding, receiving and inferring based upon the absolute or relative location of the wireless device.

29. A wireless device according to claim 19 wherein the at least one criterion comprises carrier frequency differences between the first and second base stations, bandwidth, number of strong interferers, carrier aggregation configuration of the wireless device and/or capability of the wireless device to obtain the SI.

30. A wireless device according to claim 19 wherein the at least one criterion comprises System Frame Number (SFN) synchronization differences between the first and second base stations and wherein the processor is configured to further selectively perform operations comprising:
performing the decoding if the SFN of the first and second base stations is the same; and
performing the receiving or the inferring if the SFN of the first and second base stations is different.

31. A wireless device according to claim 19 wherein the at least one criterion comprises an accuracy of time synchronization of signals transmitted by the first and second base stations, received time difference of signals at the wireless device from the first and second base stations and/or an accuracy of frequency synchronization of signals transmitted by the first and second base stations.

32. A wireless device according to claim 31 wherein the processor is configured to further selectively perform operations comprising:
performing the decoding if the accuracy of the transmit time synchronization and/or the received time difference at the wireless device is greater than their respective threshold and the accuracy of frequency synchronization is greater than a threshold; and
performing the receiving or the inferring if the accuracy of the transmit time synchronization, the received time difference at the wireless device and/or the accuracy of frequency synchronization are less than their respective thresholds.

33. A wireless device according to claim 19,
wherein the processor is configured to selectively perform operations comprising the inferring, and
wherein the inferring comprises setting at least one component of the SI of the second base station other than a System Frame Number (SFN) to be same as a corresponding at least one component of the SI of the first base station other than the SFN in response to the SFN of the first and second base stations being the same.

34. A wireless device according to claim 19 wherein the processor is configured to further perform operations comprising:
signaling a capability information to the first base station, the capability information indicating that the wireless device is capable of obtaining the SI of the second base station by selectively performing at least one of the decoding, the receiving and the inferring in response to at least one criterion.

35. A first base station of a wireless network comprising:
a wireless transceiver; and
a processor that is configured to direct a wireless device that is communicating with the first base station via the wireless transceiver to obtain System Information (SI) of a second base station of the wireless network by directing the wireless device in response to at least one criterion to selectively perform operations comprising;
decoding at least one channel of the second base station that is received by the wireless device to obtain the SI of the second base station;
receiving the SI of the second base station from a base station other than the second base station; and/or
inferring at least one component of the SI of the second base station based on a corresponding at least one component of the SI of the first base station,
wherein the processor is configured to direct the wireless device to selectively perform at least two of the operations in response to the at least one criterion, and
wherein the SI of the second base station comprises one or more components of a SystemInformationBlock (SIB) of the second base station.

36. A first base station according to claim 35, further comprising:
transmitting and/or receiving wireless device capability information, the capability information indicating that the wireless device is capable of obtaining the SI of the second base station by selectively performing at least one of the decoding, the receiving and the inferring in response to at least one criterion.

37. A first base station according to claim 36, further comprising:
transmitting the SI of the second base station to the wireless device via the wireless transceiver in response to at least one criterion and in response to the received capability information.

38. A first base station of a wireless network comprising:
a wireless transceiver; and
a processor that is configured perform operations comprising:
identifying a condition that may impact a wireless device that is communicating with the first base station via the wireless transceiver from obtaining System Information (SI) of a second base station of the same wireless network as the first base station; and
transmitting the SI of the second base station to the wireless device via the wireless transceiver in response to the identifying,
wherein the SI of the second base station comprises one or more components of a SystemInformationBlock (SIB) of the second base station.

39. A first base station according to claim 38 wherein the transmitting is preceded by obtaining the SI of the second base station.

40. A first base station according to claim 38 wherein the operations further comprise identifying a System Frame Number (SFN) of the second base station; and wherein the transmitting comprises transmitting the SI of the second base station to the wireless device via the wireless transceiver in response to the identifying and in further response to the SFN of the second base station that was identified.

41. A first base station according to claim 40 wherein the transmitting the SI of the second base station to the wireless device via the wireless transceiver is selectively performed in response to the SFN of the second base station that was identified being different than that of the first base station.

42. A first base station according to claim 38 wherein the operations further comprise:
determining an accuracy of time synchronization of signals transmitted by the first and second base stations, a received time difference of signals at the wireless device from the first and second base stations and/or an accuracy of frequency synchronization of signals transmitted by the first and second base stations; and
transmitting the SI of the second base station to the wireless device via the wireless transceiver in response to the determining.

43. A first base station according to claim 42 wherein the transmitting the SI of the second base station to the wireless device via the wireless transceiver is selectively performed in response to the accuracy of time synchronization, the received time difference and/or the accuracy of frequency synchronization being less than their respective thresholds.

* * * * *